(12) United States Patent
Duan et al.

(10) Patent No.: US 12,298,412 B2
(45) Date of Patent: May 13, 2025

(54) USER EQUIPMENT POSITIONING BASED ON A NON-TERRESTRIAL COMMUNICATION NETWORK

(71) Applicant: QUALCOMM Incorporated, San Diego, CA (US)

(72) Inventors: Weimin Duan, San Diego, CA (US); Yuxiang Peng, Sunnyvale, CA (US); Qiang Wu, San Diego, CA (US); Mehmet Izzet Gurelli, San Diego, CA (US); Jun Ma, San Diego, CA (US); Huilin Xu, Temecula, CA (US); Lianghai Ji, San Diego, CA (US); Karthik Anantha Swamy, La Jolla, CA (US); Mohamad Sayed Hassan, Paris (FR)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/726,919

(22) Filed: Apr. 22, 2022

(65) Prior Publication Data

US 2023/0341562 A1    Oct. 26, 2023

(51) Int. Cl.
*G01S 19/25* (2010.01)
*H04L 5/00* (2006.01)
(Continued)

(52) U.S. Cl.
CPC .......... *G01S 19/254* (2013.01); *H04L 5/0051* (2013.01); *H04W 24/10* (2013.01); *H04W 84/06* (2013.01)

(58) Field of Classification Search
CPC .. H04W 64/00; H04W 64/003; H04W 64/006
See application file for complete search history.

(56) References Cited

U.S. PATENT DOCUMENTS

2021/0360577 A1    11/2021    Manolakos et al.

FOREIGN PATENT DOCUMENTS

AU            698864       11/1998
AU       2003200955 B2     7/2005
(Continued)

OTHER PUBLICATIONS

International Search Report and Written Opinion—PCT/US2023/063830—ISA/EPO—Oct. 13, 2023.
(Continued)

*Primary Examiner* — Kevin Kim
(74) *Attorney, Agent, or Firm* — Weaver Austin Villeneuve & Sampson LLP/QUALCOMM

(57) ABSTRACT

Techniques are described for supporting user equipment (UE) positioning in a non-terrestrial network (NTN). To allow calculating a position/location of a UE based on reference signal (RS) measurements to and from one satellite (or a terrestrial base station), a device may be configured to calculate a doppler measurement and a range measurement and report such measurements to be used by a location server to calculate a UE position. An example device may receive a first RS (with the first RS being one of a positioning reference signal (PRS) or a sounding reference signal (SRS)), receive a second RS associated with the first RS, calculate a doppler measurement based on one or both of the first RS or the second RS, and report the doppler measurement. The doppler measurement (such as a measured frequency offset) may be used by a location server to calculate a UE position on the earth surface.

26 Claims, 9 Drawing Sheets

(51) Int. Cl.
*H04W 24/10* (2009.01)
*H04W 64/00* (2009.01)
*H04W 84/06* (2009.01)

(56) References Cited

FOREIGN PATENT DOCUMENTS

| EP | 1033582 | 9/2000 | | |
|---|---|---|---|---|
| EP | 3979670 A1 | 4/2022 | | |
| WO | WO 9941723 | 8/1999 | | |
| WO | WO 2021242886 | 12/2021 | | |
| WO | WO-2022157018 A1 * | 7/2022 | ............. | G01S 19/00 |

OTHER PUBLICATIONS

Levanon N., "Quick Position Determination Using 1 or 2 LEO Satellites", IEEE Transactions on Aerospace and Electronic Systems, IEEE Service Center, Piscataway, NJ, US, Vol. 34, No. 3, Jul. 1, 1998, XP000771655, pp. 736-754, p. 726, section Abstract, p. 738, right-hand col. 2nd paragraph—p. 739, left-hand column, 3rd paragraph, pp. 751-752, Appendix B, p. 740, right-hand column, 1st paragraph.

MEDIATEK., et al., "UE Time and Frequency Synchronisation for NR-NTN", 3GPP TSG RAN WG1 Meeting #103e, R1-2008809, 3rd Generation Partnership Project (3GPP), Mobile Competence Centre, 650, Route Des Lucioles, F-06921, Sophia-Antipolis Cedex, France, vol. RAN WG1, No. Oct. 26, 2020-Nov. 13, 2020, Oct. 23, 2020, 14 Pages, XP051945373, The Whole Document.

Partial International Search Report—PCT/US2023/063830—ISA/EPO—Jul. 13, 2023.

* cited by examiner

USER EQUIPMENT POSITIONING BASED ON A NON-TERRESTRIAL COMMUNICATION NETWORK

BACKGROUND

Field of the Disclosure

Various aspects described herein generally relate to wireless communication systems, and more particularly, to positioning using at least one communication satellite.

Description of Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may each be otherwise known as a user equipment (UE).

Standardization is ongoing to combine satellite-based communication systems with terrestrial wireless communications systems, such as 5G New Radio (NR) networks. In such a system, a UE would access a satellite, also referred to as a space vehicle (SV), which would connect to an earth station, also referred to as a ground station or non-terrestrial network (NTN) gateway, which in turn would connect to a 5G network (e.g., directly or via a base station). A 5G network could treat the satellite system as another type of Radio Access Technology (RAT) distinct from, but also similar to, terrestrial 5G NR. UE positioning may also be performed using the 5G (or other suitable wireless communication) network, for which a location server in the wireless network may determine the location of the UE in the wireless network based on properties of communications to and from the UE.

SUMMARY

Techniques are described for supporting non-terrestrial network (NTN) based positioning for a user equipment (UE). In particular, implementations are described to enable range and range rate based UE positioning using an NTN such that UE positioning may be performed based on the visibility of at least one NTN satellite to the UE. Measuring a range (such as based on a receive(rx)-transmit(tx) time difference for a signal) and a range rate (also referred to as a doppler measurement) may be based on two or more reference signals (RSs) to or from the UE. Also described are means for reporting such measurements, which may include bundling a doppler measurement with a UE time different report. Further described are means for mitigating positioning errors that may occur based on UE positioning using a single NTN satellite.

In some aspects, an example method performed by a device for performing NTN based positioning is described. The method includes receiving a first reference signal (RS) from a first device. The first RS is one of a positioning reference signal (PRS) from a base station (BS) or a sounding reference signal (SRS) from a user equipment (UE). The method also includes receiving a second RS from the first device. The second RS is associated with the first RS. The method further includes calculating a doppler measurement based on one or both of the first RS or the second RS. The method also includes reporting the doppler measurement. The doppler measurement is to be used for calculating a position of the UE.

In some implementations, only the second RS is used to calculate the doppler measurement when the second RS is not bundled with the first RS. In some other implementations, the second RS is bundled with the first RS. Bundling the second RS with the first RS includes maintaining a phase coherence between the first RS and the second RS, and calculating the doppler measurement is based on both the first RS and the second RS. In some implementations, the method also includes reporting whether the UE uses a same local oscillator (LO) for both receiving and transmitting. Calculating a range rate is based on whether the UE uses the same LO for both receiving and transmitting. In some implementations, reporting the doppler measurement includes one of reporting the doppler measurement in a NR-Doppler-SignalMeasurementInformation information element (IE) or reporting the doppler measurement in a NR-Multi-RTT-SignalMeasurementInformation IE.

In some other aspects, a device for performing NTN based positioning is described. The device includes a wireless transceiver configured to wirelessly communicate with one or more network devices, at least one memory, and at least one processor coupled to the wireless transceiver and the at least one memory. The at least one processor is configured to receive, via the wireless transceiver, a first RS from a first device. The first RS is one of a PRS from a BS or a SRS from a UE. The at least one processor is also configured to receive, via the wireless transceiver, a second RS from the first device. The second RS is associated with the first RS. The at least one processor is further configured to calculate a doppler measurement based on one or both of the first RS or the second RS. The at least one processor is also configured to report the doppler measurement. The doppler measurement is to be used for calculating a position of the UE.

In some implementations, only the second RS is used to calculate the doppler measurement when the second RS is not bundled with the first RS. In some other implementations, the second RS is bundled with the first RS. Bundling the second RS with the first RS includes maintaining a phase coherence between the first RS and the second RS, and calculating the doppler measurement is based on both the first RS and the second RS. In some implementations, the at least one processor is also configured to report whether the UE uses a same local oscillator (LO) for both receiving and transmitting. Calculating a range rate is based on whether the UE uses the same LO for both receiving and transmitting. In some implementations, reporting the doppler measurement includes one of reporting the doppler measurement in a NR-Doppler-SignalMeasurementInformation information element (IE) or reporting the doppler measurement in a NR-Multi-RTT-SignalMeasurementInformation IE.

In some further aspects, another example method performed by a device for performing NTN based positioning is described. The method includes performing multiple positioning sessions associated with a user equipment (UE) and a satellite of the NTN. The positioning sessions are scheduled to ensure that the UE is away from a subtrack of the satellite for at least a portion of the positioning sessions. The method also includes reporting results from the positioning sessions. The results are to be used for calculating a position of the UE. In some implementations, the method also includes obtaining a height of the UE and reporting the height of the UE. The height is to be used to calculate a position of the UE.

In some other aspects, another example device for performing NTN based positioning is described. The device includes a wireless transceiver configured to wirelessly communicate with one or more network devices, at least one memory, and at least one processor coupled to the wireless transceiver and the at least one memory. The at least one processor is configured to perform multiple positioning sessions associated with a UE and a satellite of the NTN. The positioning sessions are scheduled to ensure that the UE is away from a subtrack of the satellite for at least a portion of the positioning sessions. The at least one processor is also configured to report results from the positioning sessions. The results are to be used for calculating a position of the UE. In some implementations, the at least one processor is also configured to obtain a height of the UE and report the height of the UE. The height is to be used to calculate a position of the UE.

Figure 1:
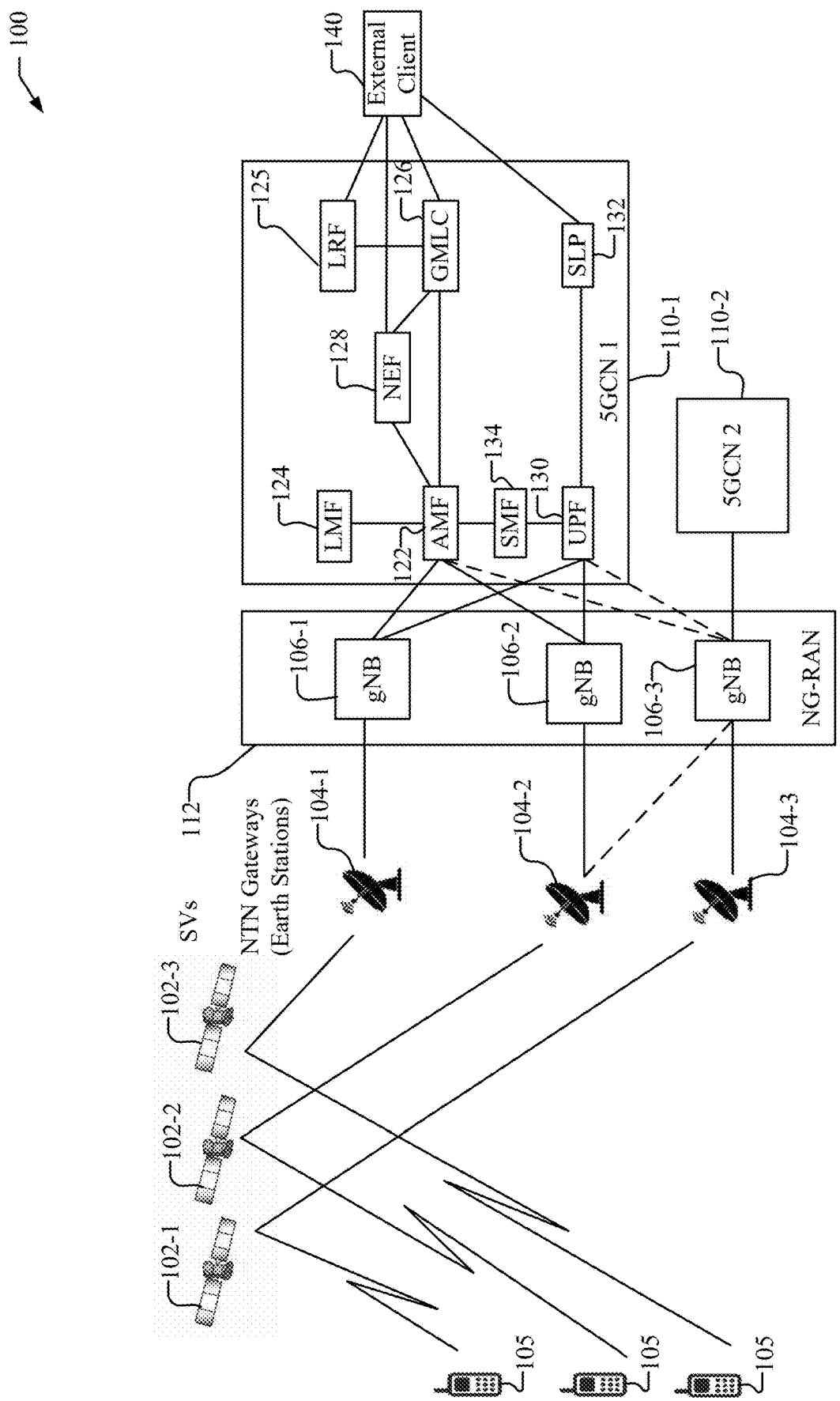
FIG. 1 shows a diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Satellites, also referred to as space vehicles (SVs) or communication satellites, may be used in communication systems, for example, using gateways and one or more satellites to relay communication signals between the gateways and one or more user equipments (UEs). A UE, for example, may access a Non-Terrestrial Network (NTN) satellite (instead of a terrestrial base station) which may be connected to an earth station (ES), which is also referred to as a ground station or NTN Gateway. The earth station in turn would connect to an element in a network such as a modified base station (without a terrestrial antenna) or a network node in a Core Network (CN). This element would in turn provide access to other elements in the network and ultimately to entities external to the network such as Internet web servers and other user devices.

A rationale for satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g. a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile new radio (NR) support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable emergency (e.g. E911) service, e.g., for a medical emergency or vehicle trouble in remote areas.

The use of satellite access may provide other benefits. For example, satellite access may reduce Mobile Network Operator (MNO) infrastructure cost. For example, an MNO may use satellite access to reduce terrestrial base stations, such as NR NodeBs, also referred to as gNBs, and backhaul deployment in sparsely populated areas. Further, satellite access may be used to overcome Internet blockage, e.g., in certain countries. Additionally, satellite access may provide diversification to Space Vehicle Operators (SVOs). For example, 5G NR satellite access could provide another revenue stream to SVOs who would otherwise provide fixed Internet access.

With TNs, the Third Generation Partnership Project (3GPP) has defined positioning services for a UE in order to determine position information of the UE (such as by a location server) within the TN coverage area. With wireless communications potentially being moved to a NTN, it is desirable for the NTN to also support UE positioning. UE positioning in a TN may be based on triangulation of the UE using signals to and/or from a plurality of base stations within range of the UE. In addition, UE communications with a satellite requires the satellite to be within a line of sight (LOS) of the UE. For UE communications with a NTN, a sufficient number of communication satellites in a low earth orbit (LEO) may not be within a LOS of the UE in order to perform triangulation. For example, only one satellite may be within a LOS of the UE. As such, performing UE positioning within a NTN may be configured to be performed based on one satellite being within a LOS of the UE. Positioning using one reference point (such as one satellite) may be based on a doppler measurement (also referred to as a range-rate) and a range (such as determined based on a rx-tx time difference) measured from signals between the satellite and the UE. As described herein, aspects for performing doppler measurements and reporting doppler measurements may be configured for a UE and one or more base stations (BSs). Also as described herein, aspects for reducing positioning errors based on UE positioning using one satellite may be configured for a UE and one or more satellites.

To note, while aspects of the present disclosure are described with reference to a UE within a NTN, some aspects of the present disclosure may be performed for a UE within a TN. For example, while example NTNs are described and a doppler measurement is described as being generated and reported with reference to a UE communicating within a NTN, a doppler measurement may be performed between a UE and a terrestrial BS, and the doppler measurement may be reported by a UE or a terrestrial BS to a location server in the wireless network. As used herein, a base station (BS) may refer to one or more components of one or more of a satellite for a NTN, a terrestrial BS for a TN, or an earth station for a NTN. The BS may include components in one device or distributed across multiple devices. As such, the term base station should not be limited to one specific type of device unless expressly stated as such.

FIG. 1 illustrates an example network architecture 100 capable of supporting satellite access using 5G New Radio (NR). FIG. 1 illustrates a network architecture with satellites that may be referred to as transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The network architecture 100 comprises a number of UEs 105, a number of SVs 102-1 to 102-3 (collectively referred to herein as SVs 102), a number of Non-Terrestrial Network (NTN) gateways 104-1 to 104-3 (collectively referred to herein as NTN gateways 104) (sometimes referred to herein simply as gateways 104, earth stations 104, or ground stations 104), and a number of NR NodeBs (gNBs) 106-1 to 106-3 (collectively referred to herein as gNBs 106) capable of communication with UEs via SVs 102 and that are part of a Next Generation (NG) Radio Access Network (RAN) (NG-RAN) 112. It is noted that the term gNB refers in general to an enhanced gNB with support for SVs and may be referred to as a gNB (e.g. in 3GPP) or sometimes may be referred to as a satellite NodeB (sNB). The network architecture 100 is illustrated as further including components of a number of Fifth Generation (5G) networks including 5G Core Networks (5GCNs) 110-1 and 110-2 (collectively referred to herein as 5GCNs 110). FIG. 1 illustrates various components within 5GCN1 110-1 that may operate with the NG-RAN 112. It should be understood that 5GCN2 110-2 and other 5GCNs may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC).

A base station may refer to one or more of a SV 102, an earth station 104, or a gNB 106. For example, a gNB 106 may be configured to provide reference signals for transmission from a SV 102 to a UE 105 to measure a doppler and a receive(rx)-transmit(tx) time difference (which is used to determine a range between the UE and the SV as the time difference times the speed of light). Additionally or alternatively, a UE 105 may be configured to provide reference signals to a SV 102, from which a gNB 106 may measure a doppler and a rx-tx time difference. In this manner, the SVs 102 may be used for both communication and UE positioning operations. Additional components of the network architecture 100 are described below. While some example components are depicted in FIG. 1, the network architecture 100 may include additional or alternative components.

Permitted connections in the network architecture 100 having the network architecture with transparent SVs illustrated in FIG. 1, allow a gNB 106 to access multiple Earth stations 104 and/or multiple SVs 102. A gNB 106, e.g., illustrated by gNB 106-3, may also be shared by multiple 5GCNs 110, and an Earth station 104, e.g., illustrated by Earth station 104-2, may be shared by more than one gNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the network architecture 100. Similarly, the network architecture 100 may include a larger (or smaller) number of SVs 102, earth stations 104, gNBs 106, NG-RAN 112, 5GCNs 110, external clients 140, and/or other components. The illustrated connections that connect the various components in the network architecture 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used to support satellite wireless access (e.g. using SVs 102) for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 140), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of 5GCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support positioning using terrestrial positioning methods in a NTN, such as Observed Time Difference of Arrival (OTDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (Rx-Tx), doppler measurement, and/or other positioning methods. While not depicted, the UE 105 may also support position determination, e.g., using signals and information from SVs in a standard positioning service (SPS), such as GPS, GLONASS, Galileo or Beidou or some other local or regional SPS such as IRNSS, EGNOS or WAAS, all of which may be generally referred to herein as GNSS.

An estimate of a location of the UE 105 may be referred to as a geodetic location, location, location estimate, location fix, fix, position, position estimate or position fix, and may be geographic, thus providing location coordinates for the UE 105 (e.g., latitude and longitude) that may or may not include an altitude component (e.g., height above sea level, height above or depth below ground level, floor level or basement level). The altitude component may be referred to as a height. A location of the UE 105 may also be expressed as an area or a volume within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically or by reference to a point, area, or volume indicated on a map, floor plan or building plan. In the description contained herein, the use of the term location or position may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The UEs 105 are configured to communicate with 5GCNs 110 via the SVs 102, earth stations 104, and gNBs 106. As illustrated by NG-RAN 112, the NG-RANs associated with the 5GCNs 110 may include one or more gNBs 106. The NG-RAN 112 may further include a number of terrestrial base stations, e.g., gNBs (not shown) that are not capable of communication with UEs via SVs 102 (not shown). Pairs of terrestrial and/or satellite base stations, e.g., gNBs and gNB 106-1 in NG-RAN 112 may be connected to one another using terrestrial links—e.g. directly or indirectly via other gNBs or gNBs 106 and communicate using an Xn interface. Access to the 5G network is provided to UEs 105 via wireless communication between each UE 105 and a serving gNB 106, via an SV 102 and an earth station 104. The gNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB. An ng-eNB may be connected to one or more gNBs 106 and/or gNBs in NG-RAN 112—e.g. directly or indirectly via other gNBs 106, gNBs and/or other ng-eNBs. An ng-eNB may provide LTE wireless access and/or evolved LTE (eLTE) wireless access to a UE 105.

A gNB 106 may be referred to by other names such as a gNB or a "satellite node" or "satellite access node." The gNBs 106 are not the same as terrestrial gNBs, but may be based on a terrestrial gNB with additional capability. For example, a gNB 106 may terminate the radio interface and associated radio interface protocols to UEs 105 and may transmit DL signals to UEs 105 and receive UL signals from UEs 105 via SVs 102 and earth stations (ESs) 104. A gNB 106 may also support signaling connections and voice and data bearers to UEs 105 and may support handover of UEs 105 between different radio cells for the same SV 102, between different SVs 102 and/or between different gNBs 106. In some systems, a gNB 106 may be referred to as a gNB or as an enhanced gNB. gNBs 106 may be configured to manage moving radio beams (for LEO SVs) and associated mobility of UEs 105. The gNBs 106 may assist in the handover (or transfer) of SVs 102 between different Earth stations 104, different gNBs 106, and between different countries. The gNBs 106 may hide or obscure specific aspects of connected SVs 102 from the 5GCN 110, e.g. by interfacing to a 5GCN 110 in the same way or in a similar way to a terrestrial gNB, and may avoid a 5GCN 110 from having to maintain configuration information for SVs 102 or perform mobility management related to SVs 102. The gNBs 106 may further assist in sharing of SVs 102 over multiple countries. The gNBs 106 may communicate with one or more earth stations 104, e.g., as illustrated by gNB 106-3 communicating with earth stations 104-2 and 104-3. The gNBs 106 may be separate from earth stations 104. The gNBs 106 alternatively may include or may be combined with one or more earth stations 104, e.g., using a split architecture. For example, with a split architecture, a gNB 106 may include a Central Unit and an earth station may act as Distributed Unit (DU). A gNB 106 may typically be fixed on the ground with transparent SV operation. In one implementation, one gNB 106 may be physically combined with, or physically connected to, one earth station 104 to reduce complexity and cost.

The earth stations 104 may be shared by more than one gNB 106 and may communicate with UE 105 via the SVs 102. Earth stations 104 may be included within a gNB 106, e.g., as a gNB-DU within a gNB 106. Earth stations 104 may communicate with SVs 102 using control and user plane protocols. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

As noted, while FIG. 1 depicts nodes configured to communicate according to 5G NR communication protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN), a Narrow Band Internet of Things (NB-IoT) protocol for an E-UTRAN supporting low bandwidth access using a variant of LTE, or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. The methods and techniques described herein for support of fixed TAs may be applicable to such other networks.

The gNBs 106 in the NG-RAN 112 may communicate with a 5G Core Access and Mobility Management Function (AMF) 122 in a 5GCN 110, which, for positioning functionality, may communicate with a Location Management Function (LMF) 124. To note, the LMF 124 may be implemented as at least one location server performing operations to identify a location of a UE within a coverage area of the wireless network or to otherwise support UE positioning. In some implementations, the gNBs 106 may provide an N2 interface to the AMF 122. An N2 interface between a gNB 106 and a 5GCN 110 may be the same as or similar to an N2 interface supported between a terrestrial gNB and a 5GCN 110 for terrestrial NR access by a UE 105 and may use the Next Generation Application Protocol (NGAP) defined in 3GPP Technical Specification (TS) 38.413 between a gNB 106 and the AMF 122. The AMF 122 may support mobility of the UE 105, including radio cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, OTDOA, RTK, PPP, DGNSS, ECID, AOA, AOD, multi-cell RTT, doppler measurements, and/or other positioning procedures including positioning procedures based on communication signals from one or more SVs 102. The LMF 124 may also process location services requests for the UE 105, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by SVs 102 or gNBs and assistance data provided to the UE 105, e.g. by LMF 124). Additionally or alternatively, at least part of the positioning functionality may be performed at a base station (such as a gNB using, e.g., signal measurements calculated from RSs transmitted by a UE 105 to a SV 102, with the RSs defined by, e.g., the LMF 124).

The GMLC 126 may support a location request for the UE 105 received from an external client 140 and may forward such a location request to the AMF 122 for forwarding by the AMF 122 to the LMF 124. A location response from the LMF 124 (e.g. containing a location estimate for the UE 105) may be similarly returned to the GMLC 126 via the AMF 122, and the GMLC 126 may then return the location response (e.g., containing the location estimate) to the external client 140. The GMLC 126 is shown connected to only the AMF 122 in FIG. 1 though in some implementations may be connected to both the AMF 122 and the LMF 124 and may support direct communication between the GMLC 126 and LMF 124 or indirect communication, e.g. via the AMF 122.

A Network Exposure Function (NEF) 128 may be included in 5GCN 110, e.g., connected to the GMLC 126 and the AMF 122. In some implementations, the NEF 128 may be connected to communicate directly with the external client 140. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet. The UPF 130 may be connected to gNBs 106 and gNBs. UPF 130 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification, and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and in some implementations, the NEF 128. The external client 140 may optionally be connected to the core network 110 and/or to a location server, which may be, e.g., an SLP, that is external to 5GCN 110, via the Internet. The external client 140 may be connected to the UPF 130 directly (not shown in FIG. 1) or through the Internet. The external client 140 may be a server, a web server, or a user device, such as a personal computer, a UE, etc.

A Location Retrieval Function (LRF) 125 may be connected to the GMLC 126, as illustrated, and in some implementations, to the SLP 132, as defined in 3GPP Technical Specification (TS) 23.167. LRF 125 may perform the same or similar functions to GMLC 126, with respect to receiving and responding to a location request from an external client 140 that corresponds to a Public Safety Answering Point (PSAP) supporting an emergency call from UE 105. One or more of the GMLC 126, LRF 125, and SLP 132 may be connected to the external client 140, e.g., through another network, such as the Internet.

The AMF 122 may normally support network access and registration by UEs 105, mobility of UEs 105, including radio cell change and handover and may participate in supporting a signaling connection to a UE 105 and possibly data and voice bearers for a UE 105. The role of an AMF 122 may be to register the UE during a registration process. The AMF 122 may page the UE 105, e.g., by sending a paging message via one or more radio cells in the tracking area in which the UE 105 is located.

As noted, while the network architecture 100 is described in relation to 5G technology, the network architecture 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

With the network 100 supporting positioning services for a UE 105, in some implementations, RSs may be transmitted on an uplink (UL) from the UE 105 to a SV 102. For example, the UE 105 may transmit one or more sounding reference signals (SRSs) and/or one or more other RFs, and a gNB 106 may use the RSs to measure a range and a doppler (or other position measurements). The gNB 106 may report the position measurements to the LMF 124, and the LMF 124 may use the position measurements to calculate a position of the UE 105. Additionally or alternatively, RSs may be defined by the LMF 124, configured by the gNB 106, and transmitted on a downlink (DL) from the SV 102 to the UE 105. The UE 105 may use the RSs to measure a range and a doppler (or other position measurements). The UE 105 may report the position measurements to the LMF 124 (such as via the SV 102, earth station 104, and gNB 106), and the LMF 124 may use the position measurements to calculate a position of the UE 105.

Figure 2:
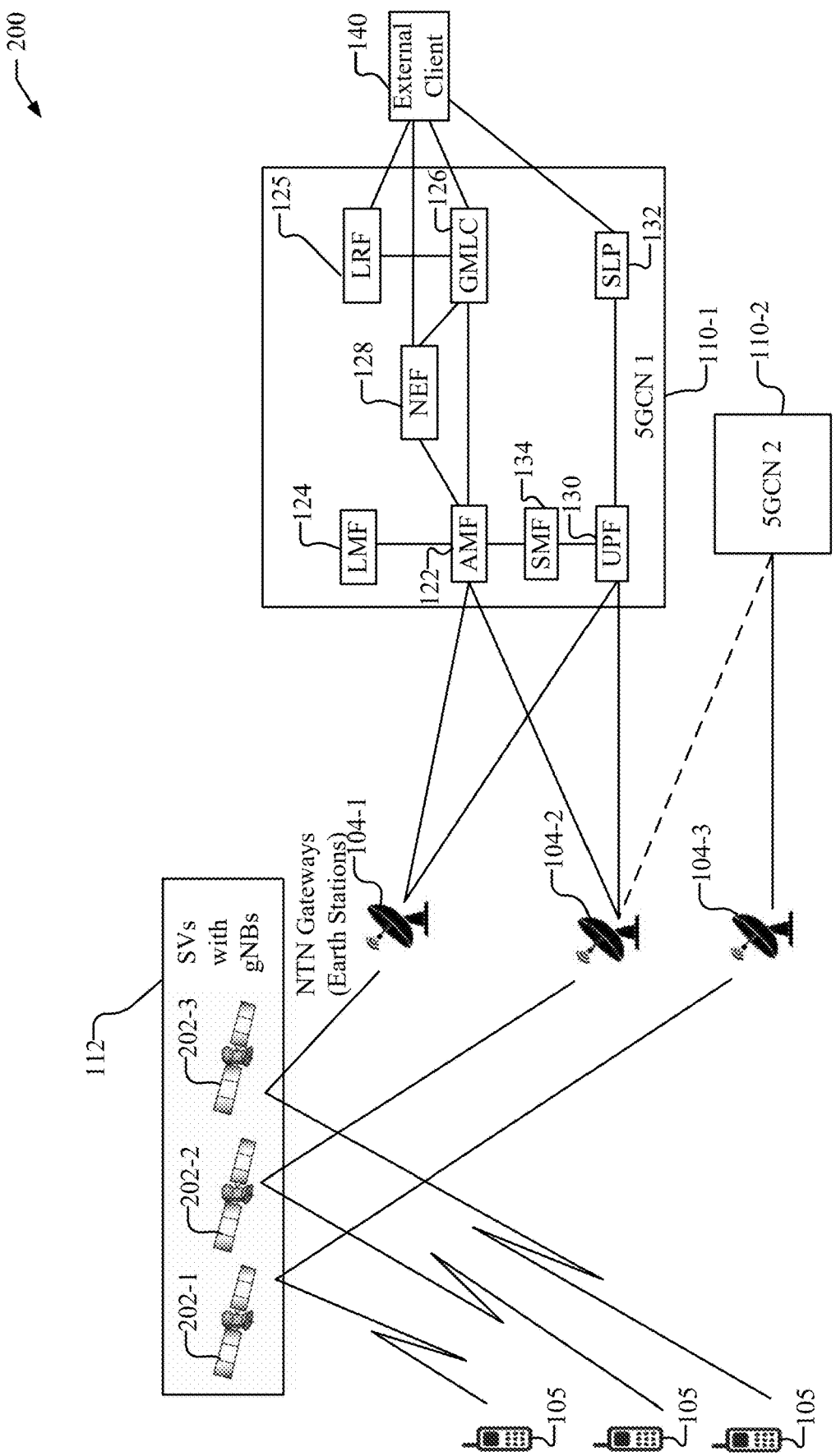
FIG. 2 shows a diagram of a communication system with a network architecture having regenerative SVs that is capable of supporting satellite access to a wireless network.

FIG. 2 shows a diagram of a network architecture 200 capable of supporting satellite access using 5G New Radio (NR). The network architecture shown in FIG. 2 is similar to that shown in FIG. 1, with like designated elements being similar or the same. FIG. 2, however, illustrates a network architecture with regenerative SVs 202-1, 202-2, and 202-3 (collectively SVs 202), as opposed to transparent SVs 102 shown in FIG. 1. A regenerative SV 202, unlike a transparent SV 102, includes an on-board gNB 202 (e.g. includes the functional capability of a gNB), and is sometimes referred to herein as an SV/gNB 202. The NG-RAN 112 is illustrated as including the SV/gNBs 202. Reference to a gNB 202 is used herein when referring to SV/gNB 202 functions related to communication with UEs 105 and 5GCNs 110, whereas reference to an SV 202 is used when referring to SV/gNB 202 functions related to communication with earth stations 104 and with UEs 105 at a physical radio frequency level. However, there may be no precise delimitation of an SV 202 versus a gNB 202. In some implementations, a regenerative SV 202 or gNB 202 may be referred to as a base station.

An onboard gNB 202 may perform many of the same functions as a gNB 106 as described previously. For example, a gNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. A gNB 202 may also support signaling connections and voice and data bearers to UEs 105 and may support handover of UEs 105 between different radio cells for the same gNB 202 and between different gNBs 202. The gNBs 202 may assist in the handover (or transfer) of SVs 202 between different Earth stations 104 or different 5GCNs 110. The gNBs 202 may hide or obscure specific aspects of SVs 202 from the 5GCN 110, e.g. by interfacing to a 5GCN 110 in the same way or in a similar way to a terrestrial gNB. The gNBs 202 may communicate with one or more earth stations 104 and with one or more 5GCNs 110 via the earth stations 104. In some implementations, gNBs 202 may communicate directly with other gNBs 202 using Inter-Satellite Links (ISLs) (not shown in FIG. 2), which may support an Xn interface between any pair of gNBs 202.

With the network 200 supporting positioning services for a UE 105, in some implementations, RSs may be transmitted on an uplink (UL) from the UE 105 to a SV 202. For example, the UE 105 may transmit one or more sounding reference signals (SRSs) and/or one or more other RFs, and the SV 202 may use the RSs to measure a range and a doppler (or other position measurements). The SV 202 may report the position measurements to the LMF 124 via an earth station 104, and the LMF 124 may use the position measurements to calculate a position of the UE 105. Additionally or alternatively, RSs may be defined by the LMF 124 and transmitted on a downlink (DL) from the SV 202 to the UE 105. The UE 105 may use the RSs to measure a range and a doppler (or other position measurements). The UE 105 may report the position measurements to the LMF 124 (such as via the SV 202 and an earth station 104), and the LMF 124 may use the position measurements to calculate a position of the UE 105.

Figure 3:
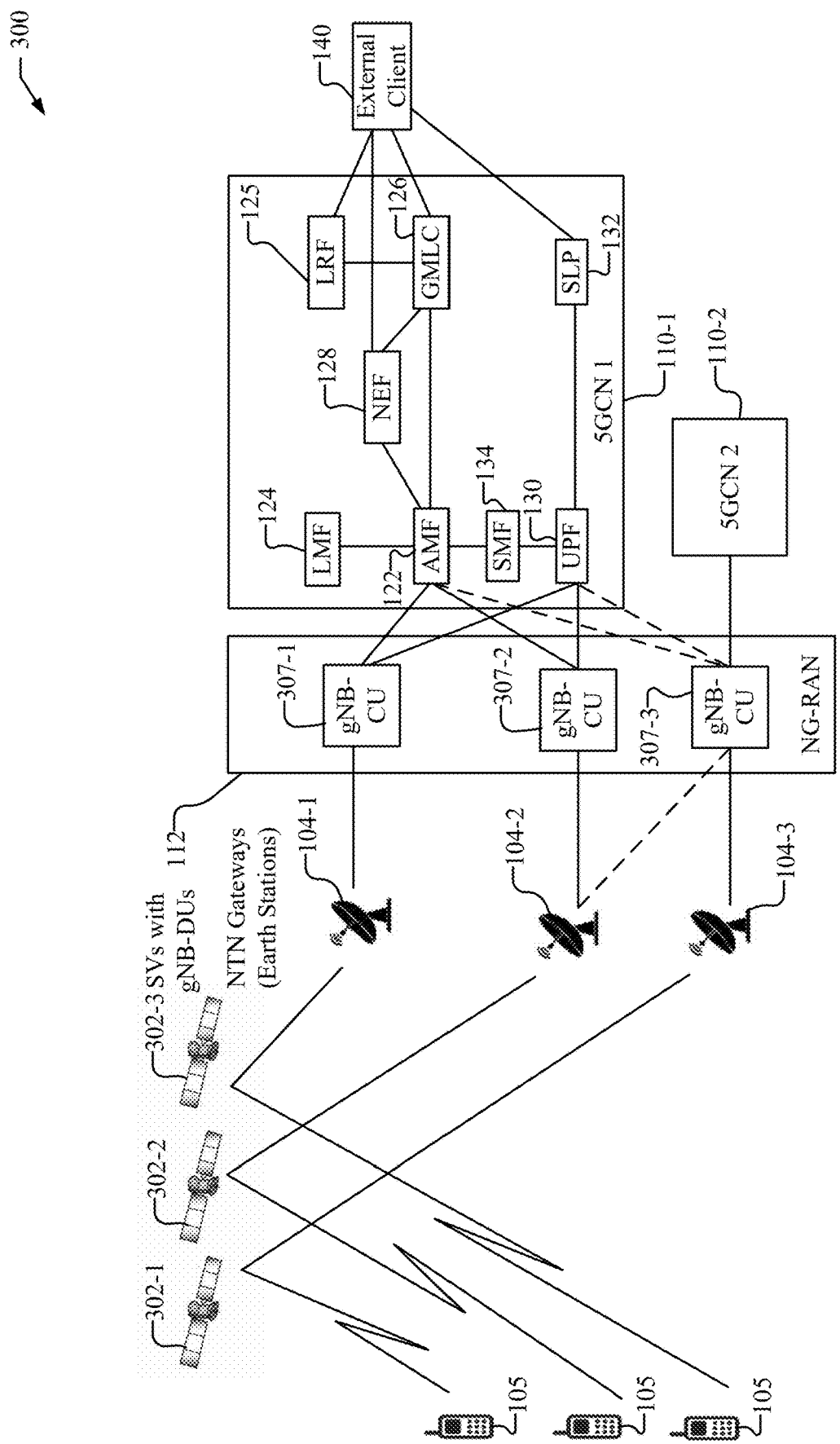
FIG. 3 shows a diagram of a communication system with a network architecture having regenerative SVs and a split satellite Node B (gNB) architecture that is capable of supporting satellite access to a wireless network.

FIG. 3 shows a diagram of a network architecture 300 capable of supporting satellite access using 5G New Radio (NR). The network architecture shown in FIG. 3 is similar to that shown in FIGS. 1 and 2, with like designated elements being similar or the same. FIG. 3, however, illustrates a network architecture with regenerative SVs 302-1, 302-2, and 302-3 (collectively referred to as SVs 302), as opposed to transparent SVs 102 shown in FIG. 1, and with a split architecture for the gNBs. The gNBs 307 include a central unit (CU) and may sometimes be referred as gNB-CU 307, and a regenerative SV 302, unlike a transparent SV 102, includes an on-board gNB Distributed Unit (gNB-DU) 302, and is sometimes referred to herein as an SV/gNB-DU 302. Reference to a gNB-DU 302 is used herein when referring to SV/gNB 302 functions related to communication with UEs 105 and gNB-CUs 307, whereas reference to an SV 302 is used when referring to SV/gNB-DU 302 functions related to communication with earth stations 104 and with UEs 105 at a physical radio frequency level. However, there may be no precise delimitation of an SV 302 versus a gNB-DU 302.

Each gNB-DU 302 communicates with one ground based gNB-CU 307 via one or more earth stations 104. One gNB-CU 307 together with the one or more gNB-DUs 302 which are in communication with the gNB-CU 307 performs functions, and may use internal communication protocols, which are similar to or the same as a terrestrial gNB with a split architecture as described in 3GPP TS 38.401. Here a gNB-DU 302 corresponds to and performs functions similar to or the same as a terrestrial gNB Distributed Unit (gNB-DU) defined in TS 38.401, while a gNB-CU 307 corresponds to and performs functions similar to or the same as a terrestrial gNB Central Unit (gNB-CU) defined in TS 38.401. For example, a gNB-DU 302 and a gNB-CU 307 may communicate with one another using an F1 Application Protocol (F1AP) as defined in 3GPP TS 38.473 and together may perform some or all of the same functions as a gNB 106 or gNB 202 as described previously. To simplify references to different types of gNB is the description below, a gNB-DU 302 may sometimes be referred to a gNB 302 (without the "DU" label), and a gNB-CU 307 may sometimes be referred to a gNB 307 (without the "CU" label).

A gNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. A gNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of a gNB-DU 302 is partly controlled by the associated gNB-CU 307. One gNB-DU 307 may support one or more NR radio cells for UEs 105. A gNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. A gNB-CU 307 may also be split into separate control plane (gNB-CU-CP) and user plane (gNB-CU-UP) portions, where a gNB-CU-CP communicates with one or more AMFs 122 in one more 5GCNs 110 using the NGAP protocol and where a gNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. A gNB-DU 302 and gNB-CU 307 may communicate over an F1 interface to (a) support control plane signaling for a UE 105 using Internet Protocol (IP), Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

A gNB-CU 307 may communicate with one or more other gNB-CUs 307 and/or with one more other terrestrial gNBs using terrestrial links to support an Xn interface between any pair of gNB-CUs 302 and/or between any gNB-CU 307 and any terrestrial gNB.

A gNB-DU 302 together with a gNB-CU 307 may: (i) support signaling connections and voice and data bearers to UEs 105; (ii) support handover of UEs 105 between different radio cells for the same gNB-DU 302 and between different gNB-DUs 302; and (iii) assist in the handover (or transfer) of SVs 302 between different Earth stations 104 or different 5GCNs 110. A gNB-CU 307 may hide or obscure specific aspects of SVs 302 from a 5GCN 110, e.g. by interfacing to a 5GCN 110 in the same way or in a similar way to a gNB.

In network architecture 300, the gNB-DUs 302 that communicate with and are accessible from any gNB-CU 307 will change over time with LEO SVs 302. With the split gNB architecture, a 5GCN 110 may connect to fixed gNB-CUs 307 which do not change over time and which may reduce difficulty with paging of a UE 105. For example, a 5GCN 110 may not need to know which SV/gNB-DUs 302 are needed for paging a UE 105. The network architecture with regenerative SVs 302 with a split gNB architecture may thereby reduce 5GCN 110 impact at the expense of additional impact to a gNB-CU 307.

With reference to FIG. 3, a base station (BS) may refer to a SV/gNB-DU 302, a gNB-CU 307, or a combination of both. For example, either or both of the SV 302 or the gNB-CU 307 may be used to calculate one or more position measurements from one or more UL RSs from a UE 105 to the SV 302. Additionally or alternatively, the gNB-CU 307 and/or the SV 302 may configure one or more DL RSs to be transmitted by the SV 302 to the UE 105 for the UE 105 to calculate one or more position measurements.

While supporting satellite access to a wireless network, an SV 102/202/302 may transmit radio beams (also referred to just as "beams") to one or more UEs and may receive one or more radio signals from the one or more UEs. Such wireless communications between a SV and a UE may be similar to wireless communications between a terrestrial base station and a UE. In many of the examples described below regarding calculating a doppler measurement, a range, or other types of position measurements for UE positioning, the wireless communications are described as being between a UE and a base station (BS), which may refer to, e.g., a terrestrial gNB or a SV for a NTN. To note, for the examples provided herein, SV, satellite, NTN satellite, and LEO satellite are used interchangeably unless specifically stated otherwise.

If a UE communicates with one base station (whether terrestrial or non-terrestrial), UL RSs (such as SRSs or other defined RSs) or DL RSs (such as PRSs or other defined RSs) may be used to calculate a doppler measurement and a range associated with the UE with reference to the base station.

Figure 4:
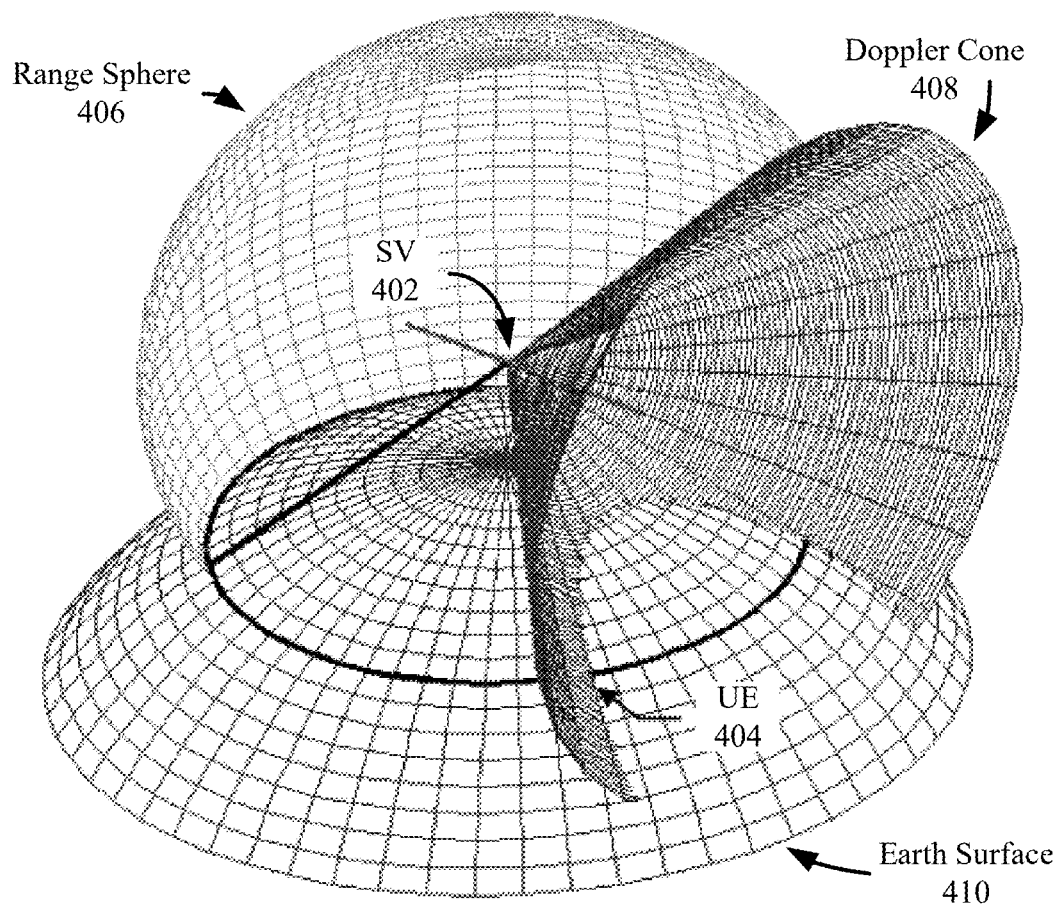
FIG. 4 illustrates example position measurements calculated in a non-terrestrial network (NTN) that may be used to calculate a position of a UE communicating with a SV.

FIG. 4, by way of example, illustrates example position measurements calculated in a NTN that may be used to determine a position of a UE 404 communicating with a SV 402. The SV 402 may be an example of any suitable satellite, such as one of the SVs 102, 202, or 302. The UE 404 may be an example of UE 105.

A range measurement may be used to indicates or determine a distance between the SV 402 and the UE 404. For example, the range may be a rx-tx transmission time difference (which may be used to calculate a RTT that may be used to calculate the distance) or another suitable measurement associated with one or more RSs transmitted between the SV 402 and the UE 404. If the range is considered to be associated with a distance of the UE 404 away from the SV 402, the range sphere indicates the potential locations of the UE 404 based exclusively on the calculated distance. Since the UE 404 is located approximately on the earth surface 410, the UE 404 may be situated anywhere along the intersection of the range sphere 406 and the earth surface 410 (which is approximately a circle on the earth surface 410).

A doppler measurement indicates a motion between the UE 404 and SV 402 based on frequency changes between tx and rx of one or more RSs by the UE 404 and SV 402. The doppler cone 408 indicates the surface of potential locations of the UE 404 based on exclusively on the doppler measurement. Since the UE 404 is located approximately on the earth surface 410, the UE 404 may be situated anywhere along the intersection of the doppler cone 408 and the earth surface 410 (which is approximately an arc on the earth surface 410).

In using both a range and a doppler measurement, the UE 404 may be calculated as being located at the intersection of the range sphere 406, the doppler cone 408, and the earth surface 410 (which may be two points on the earth surface 410). Previously calculated UE locations or other information may thus be used to identify the location of the UE 404, such as depicted in FIG. 4. To note, the height of the UE 404 from the earth surface 410, whether the UE 404 is positioned on or near the SV 402's subtrack, or other potential factors that may impact the position measurements and cause errors in the calculated location of the UE are not depicted in the example for clarity purposes. As such, UE positioning by a location server in a NTN (such as LMF 124) may be based on a range and a doppler measurement as measured by a UE and/or a base station (such as a SV and/or a gNB communicably coupled to the SV).

Figure 5:
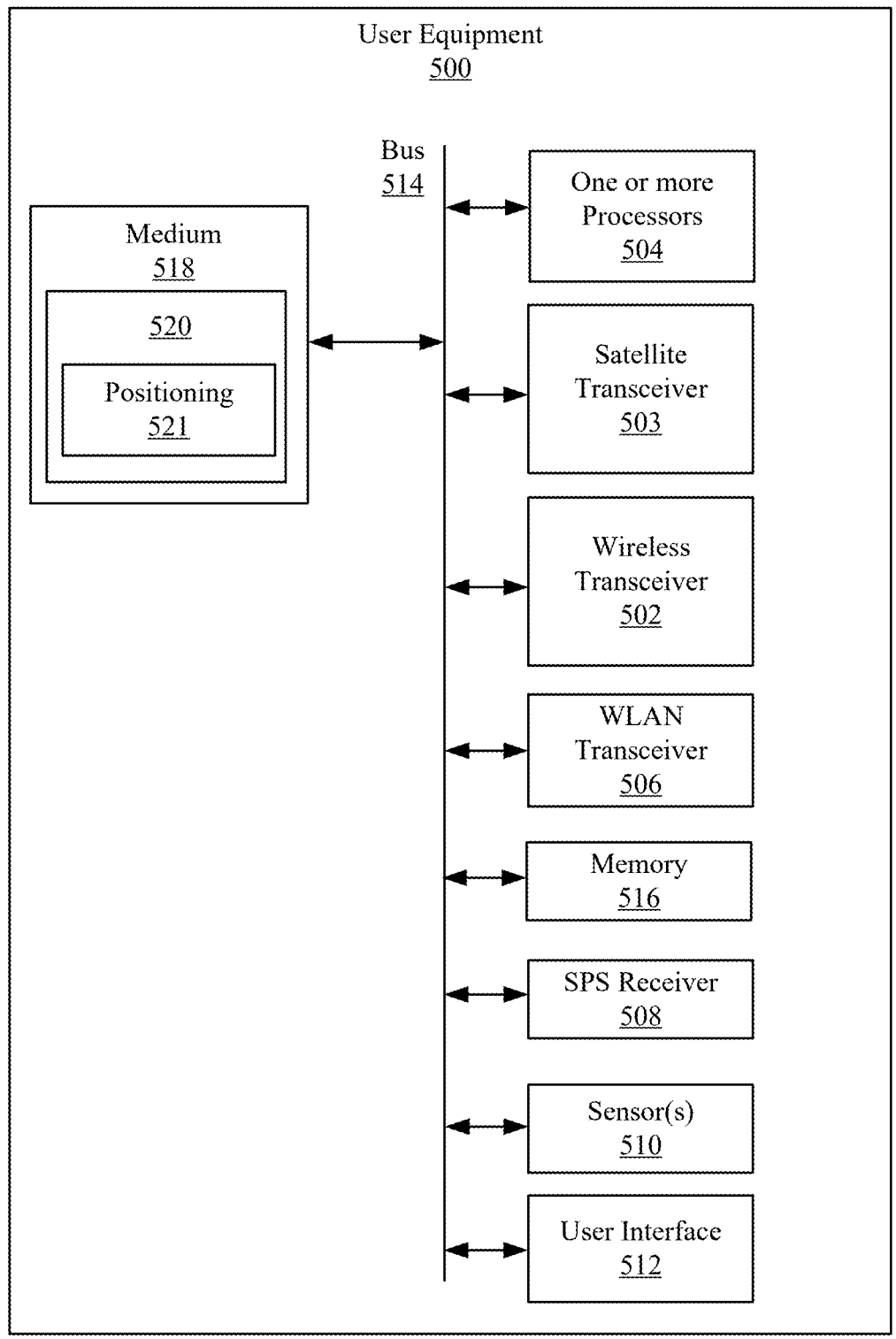
FIG. 5 is a diagram illustrating an example of a hardware implementation of a UE configured to support NTN based UE positioning.

FIG. 5 is a diagram illustrating an example of a hardware implementation of UE 500, such as UE 105 shown in FIGS. 1, 2, and 3, that is configured to support NTN based UE positioning. The UE 500 may include, e.g., hardware components such as a satellite transceiver 503 to wirelessly communicate with an SV 102/202/302 via a wireless antenna (not shown in FIG. 5), e.g., as shown in FIGS. 1, 2, and 3. The UE 500 may further include a wireless transceiver 502 to wirelessly communicate with terrestrial base stations in an NG-RAN 112 via a wireless antenna (not shown in FIG. 5), e.g., base stations such as a gNB or an ng-eNB. The UE 500 may also include additional transceivers, such a wireless local area network (WLAN) transceiver 506.

While the satellite transceiver 503 is depicted as a separate component from the wireless transceiver 502 in FIG. 5, the satellite transceiver 503 may also be referred to as a wireless transceiver to communicate with one or more network devices. Similarly, while a WLAN transceiver 506 is depicted as a separate component from the wireless transceiver 502 in FIG. 5, the WLAN transceiver 506 may also be referred to as a wireless transceiver to communicate with one or more network devices. Network devices may include, e.g., a terrestrial base station, a core network component, an earth station, a SV, a WLAN access point, a UE, or other devices in a wireless network. As such, the term wireless transceiver, as used herein, may refer to any suitable type of transceiver for terrestrial or non-terrestrial network communications, and the UE may have one or more wireless transceivers for one or more different communication types. In some implementations, the UE 500 may also include an SPS receiver 508 for receiving and measuring signals from an SPS SV via a wireless antenna (not shown in FIG. 5).

In some implementations, the UE 500 may receive data from a satellite, e.g., via satellite transceiver 503, and may respond to a terrestrial base station, e.g., via wireless transceiver 502, or via WLAN transceiver 506. For example, if the UE 500 is to measure a doppler and a range (or other position measurements) from DL RSs from an SV, the satellite transceiver 503 may receive the DL RSs from the SV. The UE 500 may then report the position measurements terrestrially via the wireless transceiver 502 or the WLAN transceiver 506. Alternatively, the UE 500 may report the position measurements via the satellite transceiver 503 to an SV. The final destination of the position measurements may be a location server to calculate the location of the UE (or perform other operations) based on the position measurements. Thus, UE 500 may include one or more transmitters, one or more receivers, or both, and these may be integrated, discrete, or a combination of both.

The UE 500 may further include one or more sensors 510, such as one or more cameras, an accelerometer, a gyroscope, an electronic compass, a magnetometer, a barometer (which may be a barometric altimeter), etc. The UE 500 may further include a user interface 512 that may include e.g., a display, a keypad or other input device, such as a virtual keypad on the display, through which a user may interface with the UE 500. The UE 500 further includes one or more processors 504, a memory 516 (which may include one or more memories), and a non-transitory computer readable medium 518 (also referred to as a medium), which may be coupled together with bus 514. The one or more processors 504 and other components of the UE 500 may similarly be coupled together with bus 514, a separate bus, or may be directly connected together or coupled using a combination of the foregoing.

The one or more processors 504 may be implemented using a combination of hardware, firmware, and software. For example, the one or more processors 504 may be configured to perform the functions discussed herein by implementing one or more instructions or program code 520 on a non-transitory computer readable medium, such as medium 518 and/or memory 516. In some implementations, the one or more processors 504 may represent one or more circuits configurable to perform at least a portion of a data signal computing procedure or process related to the operation of UE 500.

The medium 518 and/or memory 516 may store instructions or program code 520 that contain executable code or software instructions that when executed by the one or more processors 504 cause the one or more processors 504 to operate as a special purpose computer programmed to perform the techniques disclosed herein. As illustrated in UE 500, the medium 518 and/or memory 516 may include one or more components or modules that may be implemented by the one or more processors 504 to perform the methodologies described herein. While the components or modules are illustrated as software in medium 518 that is executable by the one or more processors 504, it should be understood that the components or modules may be stored in memory 516 or may be dedicated hardware either in the one or more processors 504 or off the processors.

A number of software modules and data tables may reside in the medium 518 and/or memory 516 and be utilized by the one or more processors 504 in order to manage both communications and the functionality described herein. It should be appreciated that the organization of the contents of the medium 518 and/or memory 516 as shown in UE 500 is merely exemplary, and as such the functionality of the modules and/or data structures may be combined, separated, and/or be structured in different ways depending upon the implementation of the UE 500. For the example operations described herein, the term memory may refer to any suitable medium or memory of a UE or other devices. As such, medium and memory may be used interchangeably herein unless otherwise explicitly stated. In addition, while components or modules are illustrated as software in medium 518 and/or memory 516 that is executable by the one or more processors 504, it should be understood that the components or modules may be firmware or dedicated hardware either in the one or more processors 504 or off the processors.

As illustrated, the program code 520 stored on medium 518 and/or memory 516 may include a positioning module 521 that when implemented by the one or more processors 504 may configure the one or more processors 504 to perform one or more positioning sessions. During a positioning session, the UE 500 may receive, via a wireless transceiver (such as the wireless transceiver 502 or satellite transceiver 503) one or more RSs from a base station (such as from a terrestrial base station or a SV). For example, for a NTN, implementing the positioning module 521 may cause the UE 500 to receive a first RS (such as a PRS) and a second RS (such as a second PRS, a tracking reference signal (TRS), a synchronization signal block (SSB), or a demodulation reference signal (DMRS) associated with the UE) from a SV. Additional or alternative to receiving one or more RSs, the UE may transmit one or more RSs to a base station (such as to a SV or to a terrestrial base station). For example, for a NTN, implementing the positioning module 521 may cause the UE 500 to transmit a first RS (such as a SRS) and a second RS (such as a second SRS, a physical random access channel (PRACH) signal, or a DMRS associated with the UE) to a SV. Receiving or transmitting the RSs may include configuring a wireless transceiver (such as the satellite transceiver 503) to receive or transmit such RSs, and the RSs may be defined by the location server in the wireless network and indicated to the UE before performing one or more positioning sessions.

If the UE 500 is to receive RSs from a base station (such as from a SV or a terrestrial base station), a positioning session may also include the UE 500 (such as via one or more processors 504 or another component) measuring one or more position measurements (such as a doppler measurement and/or a range) from the received RSs. To note, a position measurement may refer to any suitable measurement that may be used to calculate the location of the UE 500. For example, a range measurement may include a measured RTT, tx-rx time difference, or an actual distance between the UE 500 and the other network device.

The positioning session may further include reporting at least a portion of the position measurements. A UE reporting a position measurement may include transmitting an information element (IE) including the position measurement to a base station (such as a SV or a terrestrial base station), and the position measurement may reach a final destination of a location server in the wireless network (with the location server to use the position measurements to calculate a location of the UE). IEs defined in one or more standards by 3GPP may be used to report one or more position measurements, and/or a proprietary IE may be used to report one or more position measurements.

The methodologies described herein may be implemented by various means depending upon the application. For example, these methodologies may be implemented in hardware, firmware, software, or any combination thereof. For a hardware implementation, the one or more processors 504 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 500 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 518 or memory 516 and executed by one or more processors 504, causing the one or more processors 504 to operate as a special purpose computer programmed to perform the techniques disclosed herein. Memory may be implemented within the one or processors 504 or external to the one or more processors 504. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 500 may be stored as one or more instructions or code on a non-transitory computer-readable storage medium such as medium 518 or memory 516. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 500 may be provided as signals on transmission media included in a communication apparatus. For example, a communication apparatus comprising part or all of UE 500 may include a transceiver having signals indicative of instructions and data. The instructions and data are stored on non-transitory computer readable medium 518 or memory 516, and are configured to cause the one or more processors 504 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 6:
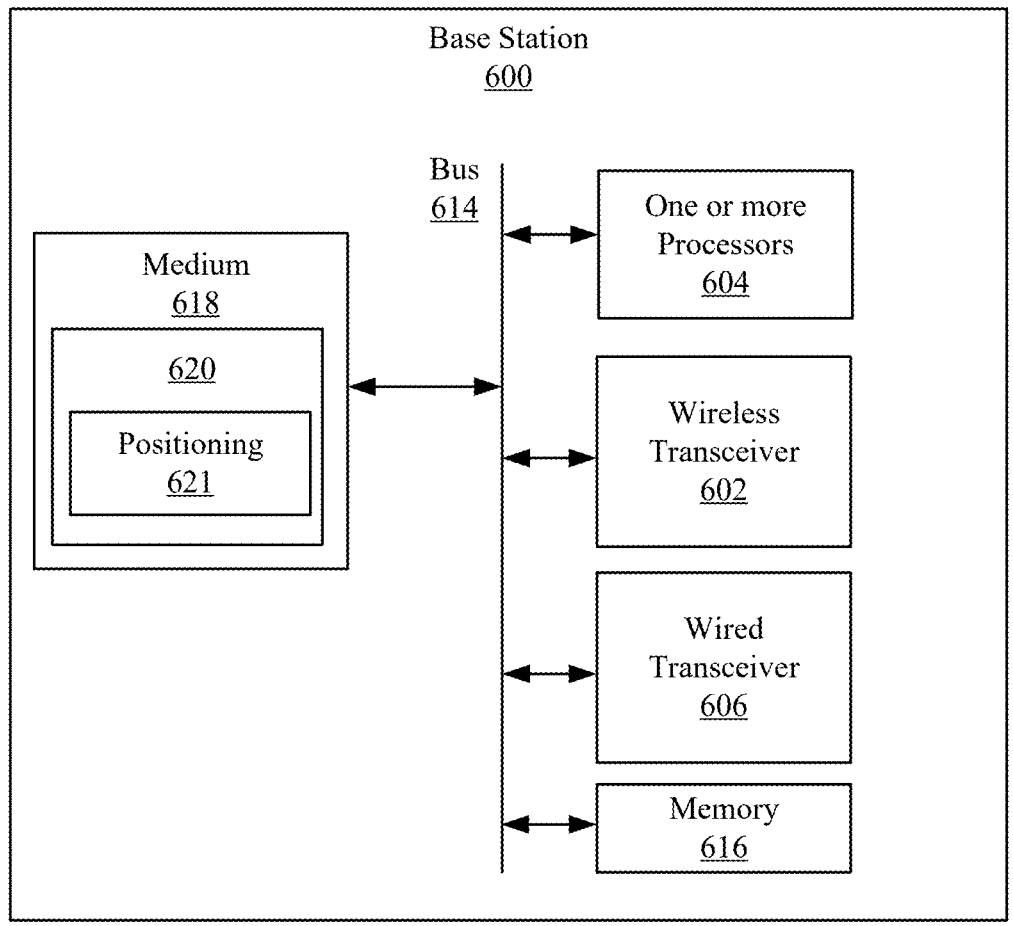
FIG. 6 is a diagram illustrating an example of a hardware implementation of a base station configured to support NTN based UE positioning.

FIG. 6 is a diagram illustrating an example of a hardware implementation of base station 600 that is configured to support NTN based UE positioning. As noted herein for a NTN, a base station may include components of one or more of a SV, an earth station, or a gNB. As such, while the base station 600 is depicted as a single device, the components of the base station 600 may be distributed across a plurality of devices. For a TN, the base station 600 may be a terrestrial base station. The base station 600 includes a wireless transceiver 602. For a NTN, the wireless transceiver may include a satellite transceiver 503 of a SV to wirelessly communicate with a UE 105 via a wireless antenna (not shown in FIG. 6), e.g., as shown in FIGS. 1, 2, and 3. For a TN 600, the wireless transceiver include a wireless transceiver to send or receive terrestrial signals to wirelessly communicate with a UE 105 via a wireless antenna (not shown in FIG. 6). If the base station 600 includes an earth station or other terrestrial device, the base station 600 may also include a wired transceiver 602 to communicably couple with the core network or another suitable network device. For example, referring back to FIG. 1, a base station may include components of a SV 102, an earth station 104, and a gNB 106. The SV 102 and earth station 104 include a wireless transceiver for communication with the UE and each other, and the gNB may include a wired transceiver for communication with the core network.

The base station 600 further includes one or more processors 604, a memory 616 (which may include one or more memories), and a non-transitory computer readable medium 618 (also referred to as a medium), which may be coupled together with bus 614. The one or more processors 604 and other components of the base station 600 may similarly be coupled together with bus 614, a separate bus, or may be directly connected together or coupled using a combination of the foregoing.

The one or more processors 604 may be implemented using a combination of hardware, firmware, and software. For example, the one or more processors 604 may be configured to perform the functions discussed herein by implementing one or more instructions or program code 620 on a non-transitory computer readable medium, such as medium 618 and/or memory 616. In some implementations, the one or more processors 604 may represent one or more circuits configurable to perform at least a portion of a data signal computing procedure or process related to the operation of base station 600.

The medium 618 and/or memory 616 may store instructions or program code 620 that contain executable code or software instructions that when executed by the one or more processors 604 cause the one or more processors 604 to operate as a special purpose computer programmed to perform the techniques disclosed herein. As illustrated in base station 600, the medium 618 and/or memory 616 may include one or more components or modules that may be implemented by the one or more processors 604 to perform the methodologies described herein. While the components or modules are illustrated as software in medium 618 that is executable by the one or more processors 604, it should be understood that the components or modules may be stored in memory 616 or may be dedicated hardware either in the one or more processors 604 or off the processors.

A number of software modules and data tables may reside in the medium 618 and/or memory 616 and be utilized by the one or more processors 604 in order to manage both communications and the functionality described herein. It should be appreciated that the organization of the contents of the medium 618 and/or memory 616 as shown in base station 600 is merely exemplary, and as such the functionality of the modules and/or data structures may be combined, separated, and/or be structured in different ways depending upon the implementation of the base station 600. For the example operations described herein, the term memory may refer to any suitable medium or memory of a base station (such as one or more of a SV, earth station, gNB, or other devices). As such, medium and memory may be used interchangeably herein unless otherwise explicitly stated. In addition, while components or modules are illustrated as software in medium 618 and/or memory 616 that is executable by the one or more processors 604, it should be understood that the components or modules may be firmware or dedicated hardware either in the one or more processors 604 or off the processors.

As illustrated, the program code 620 stored on medium 618 and/or memory 616 may include a positioning module 621 that when implemented by the one or more processors 604 may configure the one or more processors 604 to perform one or more positioning sessions. During a positioning session, the base station 600 may receive, via a wireless transceiver, one or more RSs from a UE. For example, for a NTN, implementing the positioning module 621 may cause a SV to receive a first RS (such as a SRS) and a second RS (such as a second SRS, a physical random access channel (PRACH) signal, or a DMRS associated with the UE) from a UE. Additional or alternative to receiving one or more RSs, the base station may transmit one or more RSs to a UE. For example, for a NTN, implementing the positioning module 621 may cause the base station 600 to transmit a first RS (such as a PRS) and a second RS (such as a second PRS, a TRS, a SSB, or a DMRS associated with the UE) to a UE. Receiving or transmitting the RSs may include configuring the wireless transceiver 602 to receive or transmit such RSs, and the RSs may be defined by the location server in the wireless network and indicated to the base station (such as to a gNB) before performing one or more positioning sessions.

If the base station 600 is to receive RSs from a UE (such as a regenerative SV receiving RSs from a UE), a positioning session may also include the base station 600 (such as via one or more processors 604 or another component) measuring one or more position measurements (such as a doppler measurement and/or a range) from the received RSs. As noted above, a position measurement may refer to any suitable measurement that may be used to calculate the location of the UE 500. For example, a range measurement may include a measured RTT, tx-rx, or an actual distance between the UE and the base station.

The positioning session may further include reporting at least a portion of the position measurements. A base station reporting a position measurement may include transmitting an information element (IE) including the position measurement to a component of the core network, and the position measurement may reach a final destination of a location server in the wireless network (with the location server to use the position measurements to calculate a location of the UE). For example, if the SV includes a gNB, the SV may use a wireless transceiver to transmit the position measurements to an earth station, which may relay the position measurements to a core network component. In another example, if a gNB is separate from an SV, or the NTN includes gNB-DUs and gNB-CUs, the terrestrial gNB may use a wired transceiver to transmit the position measurements to a core network component.

The methodologies described herein may be implemented by various means depending upon the application. For example, these methodologies may be implemented in hardware, firmware, software, or any combination thereof. For a hardware implementation, the one or more processors 604 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of base station 600 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 618 or memory 616 and executed by one or more processors 604, causing the one or more processors 604 to operate as a special purpose computer programmed to perform the techniques disclosed herein. Memory may be implemented within the one or processors 504 or external to the one or more processors 604. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by base station 600 may be stored as one or more instructions or code on a non-transitory computer-readable storage medium such as medium 618 or memory 616. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for base station 600 may be provided as signals on transmission media included in a communication apparatus. For example, a communication apparatus comprising part or all of base station 600 may include a transceiver having signals indicative of instructions and data. The instructions and data are stored on non-transitory computer readable medium 618 or memory 616, and are configured to cause the one or more processors 604 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

As noted herein, one or more positioning sessions between a UE and a base station (such as a SV) may be performed to calculate position measurements associated with the location of the UE. In performing a positioning session, a device (such as a UE or a base station) may calculate a doppler measurement and/or a range measurement (such as a RTT or a rx-tx time difference). In being configured to calculate and use a doppler measurement and a range measurement for positioning, a location of a UE may be calculated based on the UE being within the line of sight of only one satellite of a NTN. To calculate a doppler measurement, a RS may need to be defined to be used for doppler measurement. As described herein, two RSs may be defined to be received by a device. At least one of the two RSs may be used to calculate a range measurement, and at least one of the two RSs may be used to calculate a doppler measurement (which may be the same or different RSs than for calculating the range measurement).

Figure 7:
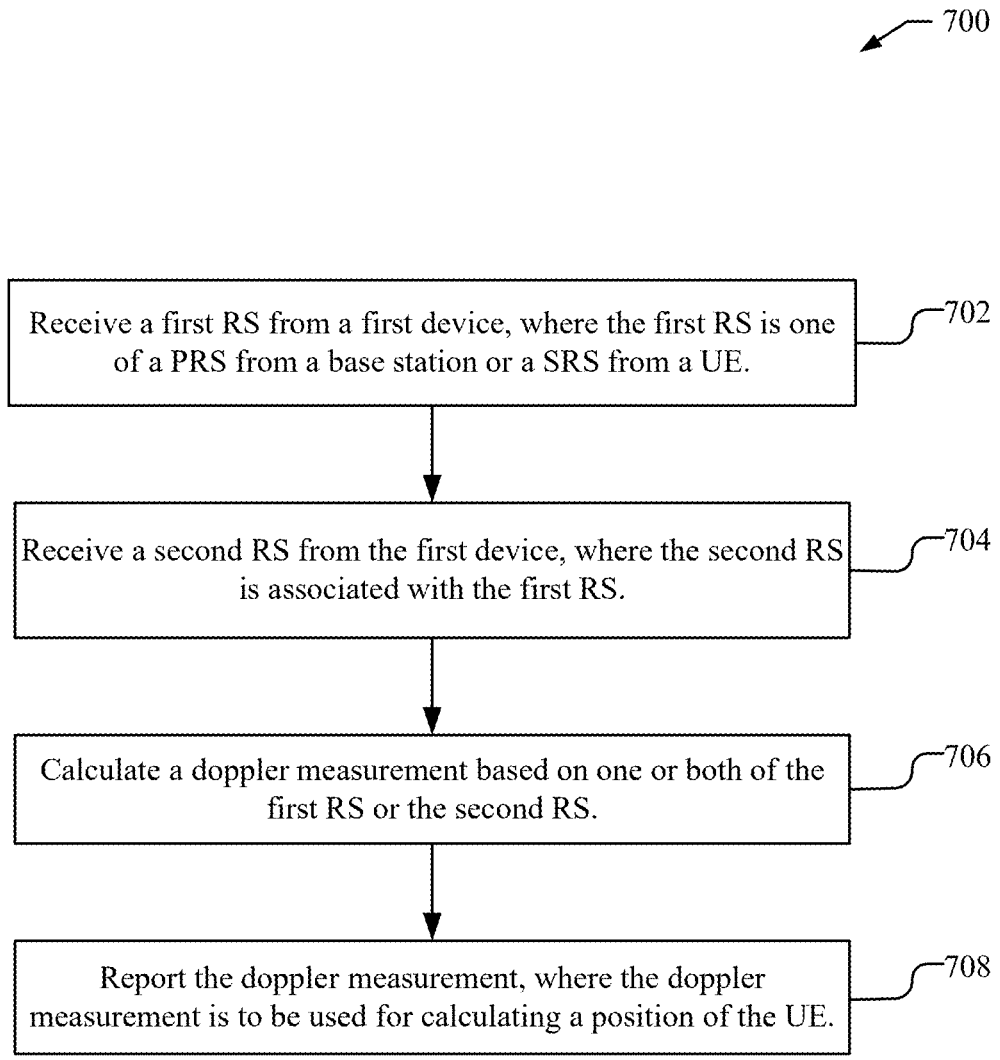
FIG. 7 shows a flowchart of an example procedure for performing NTN based UE positioning.

FIG. 7 shows a flowchart of an example procedure 700 for performing NTN based UE positioning. The process 700 may be performed by a UE (such as the UE 500) or a base station (such as the base station 600) performing one or more UE positioning sessions. For NTN based positioning, transmission of RSs used to calculate one or more position measurements may occur between a UE and a SV (such as depicted in FIGS. 1, 2, and 3). The process 700 (and other processes described below) is described as being performed by a device. Unless explicitly stated otherwise in the example implementations described below, a device performing an operation may refer to a UE or a base station performing such operation. In addition, a base station performing an operation may refer to a SV, an earth station, a gNB, or a combination of network devices performing the operation.

At 702, the device receives a first RS from a first device, where the first RS is one of a PRS from a base station (BS) or a SRS from a UE. If the device receiving the first RS is a UE, the first device is a BS, and the first RS is a PRS received on a DL from the BS. For example, the UE may receive, via a wireless transceiver (such as a satellite transceiver), a PRS from a SV in a NTN. If the device receiving the second RS is a BS (such as including a SV in a NTN), the first device is a UE, and the first RS is a SRS received on a UL from the UE. For example, a SV may receive, via a wireless transceiver (i.e., a satellite transceiver), a SRS from a UE.

At 704, the device receives a second RS from the first device, where the second RS is associated with the first RS. The second RS may be any suitable RS from the first device. For example, if the device receiving the first RS is a UE, the second RS may be one of a second PRS, a TRS, a SSB, or a DMRS associated with the UE. A first PRS and a second PRS may refer to different instances (such as consecutive instances) of the PRS. If the device receiving the second RS is a BS (such as including a SV in a NTN), the second RS may be one of a second SRS, a PRACH signal, or a DMRS. A first SRS and a second SRS may refer to different instances (such as consecutive instances) of the SRS.

A first RS being associated with a second RS may include the second RS being within a defined time window of the first RS. In this manner, the second RS may be received in less than a defined maximum amount of time from receiving the first RS. The defined time window may be of any suitable length, which may be defined by a standard or may be proprietary. The first and second RSs being closely allocated in the time domain may allow a receiving device to receive the RSs without noise being introduced as a result of a power amplifier (PA), a local oscillator (LO), or other components used by a wireless transceiver to receive the RSs. For example, if the first and the second RSs are separated by an amount of time such that the device transmits a signal in between receiving the two RSs, the PA switches between different states (such as increasing a power output for transmission). Switching between different states is associated with an amount of time for the PA to settle. During such time, any signals received may have noise included as a result of the PA settling. If the first and second RSs are closely allocated so that the PA does not change states in between receiving the first RS and the second RS, the received RSs are not impacted by noise caused by the PA settling from switching states. Additionally or alternatively, if a same LO is used for transmission and reception, the LO is to be used to tune to a first frequency for reception and a second frequency for transmission. Switching between the first and second frequencies is also associated with an amount of time for the frequencies to settle. During such time, any signals received may have noise included as a result of the frequency settling. If the first and second RSs are closely allocated so that no transmission is to occur between receiving the first RS and the second RS, the received RSs are not impacted by noise caused by settling from switching frequencies.

The second RS being associated with the first RS may refer to the second RS being quasi-colocated (QCLed) with the first RS. In some implementations, the quasi-colocation (QCL) of the RSs may be based on one or more QCL types defined in technical specification (TS) 38.214 from the 3GPP. In TS 38.214, QCL Types A through D are defined. QCL Type A, QCL Type B, and QCL Type C allow for a device to calculate a doppler measurement (also referred to as a doppler shift) from the QCLed RSs. As such, the QCL between the first RS and the second RS may be one of QCL Type A, QCL Type B, or QCL Type C. with the RSs configured according to such QCL. To note, QCL Type C may be the minimum QCL Type that may be used for calculating a doppler measurement. For example, the location server may provide assistance data that indicates information regarding the RSs, such as defining the RSs to be used (such as a PRS and a SSB for a DL) and the QCL Type. The base station (such as the gNB) may configure the RSs to be transmitted to the UE based on the assistance data, with the SV transmitting the RSs to the UE. As a result, the UE may calculate a doppler shift from the QCLed RSs.

At 706, the device calculates a doppler measurement based on one or both of the first RS or the second RS. For example, the device may calculate a doppler measurement exclusively from the first RS (such as a first PRS or SRS), exclusively from the second RS (such as a second PRS or SRS, a TRS, a SSB, a PRACH signal, or a DMRS), or from a combination of the first RS and the second RS. While not shown in FIG. 7, the device may also calculate a range measurement (range) from the first RS (such as calculating a rx-tx transmission time difference for a PRS or a SRS).

Whether a doppler measurement is to be calculated from only one of the RSs or both of the RSs may be based on whether the second RS is bundled with the first RS. Bundling may refer to a phase coherence being maintained between the first RS and the second RS, with the RSs being transmitted on the same carrier frequency. For example, a transmitting device using the same carrier frequency and the same PA stage to transmit the first RS and the second RS within a short amount of time of each other (such as consecutively or within a few symbols of each other) allows a receiving device to use both RSs to measure a doppler shift (which is based on an observed change in frequency) since the carrier frequency and phase remains consistent between the two RSs. If phase coherence between the RSs is not maintained, the receiving device may be limited to using only one of the RSs to measure a doppler shift. For example, the receiving device may use only the second RS to calculate a doppler measurement. The transmitting device (such as the base station for DL RSs or the UE for UL RSs) may be responsible for maintaining the phase coherence if the phase coherence is to be maintained. To note, any existing RS bundling scheme (such as any bundling schemes defined in the set of standards from the 3GPP for NR) may be applied by a transmitting device to maintain phase coherence.

In some implementations, bundling the first RS and the second RS may include allocating the first RS and the second RS within a same bandwidth (BW). As noted above, bundling RSs to maintain phase coherence may include using the same PA state and carrier frequency for transmitting both RSs. If the RSs are allocated with the same BW, the transmitting device may use the same PA state and carrier frequency (without switching between the RSs) to transmit both RSs to prevent a phase jump between transmissions of the RSs. In this manner, the first RS and the second RS may be received in the same BW.

However, a device may be scheduled to transmit a smaller BW signal on an UL, DL, or sidelink (SL) between transmissions of the first RS and the second RS. For example, a base station may schedule to transmit a SSB (with a smaller BW than a PRS) after a PRS and before the second RS, or a UE may schedule to transmit a SSB (with a smaller BW than a SRS) after a SRS and before the second RS. As such, the transmitting device may need to change the PA from a first state to a second state to transmit the signal between the RSs and change the PA back to the first state to transmit the second RS (such as a second PRS or SRS). As noted above, switching PA states may require a settling time of a number of symbols to ensure the PA state being recently switched does not introduce noise into a signal. In some implementations of maintaining phase coherence, the second RS may be transmitted at least a minimum time gap of symbols between the transmission of the signal between the RSs and the second RS. Such a minimum time gap is to ensure that the PA and any other components settle after switching states before transmitting the second RS.

The number of symbols between transmissions of the signal and the second RS may be defined in any suitable manner. In some implementations, if the UE transmits the RSs on an UL to a SV, the minimum number of symbols between transmissions may be defined in a standard (such as by the 3GPP), may be based on a specification of the UE regarding settling time of the PA, or may be based on a UE capability report provided by the UE to the network. For example, the location server may receive the UE capability report, identify a settling time needed by the UE from the UE capability report, define the first RS and the second RS to ensure a sufficient number of symbols exists between an intermediary signal that may be transmitted and the second RS, and indicate the RSs in assistance data to a base station (with the base station to indicate the RSs to the UE). In this manner, the transmitting device configures the RSs so that a PA is allowed to settle after switching states after transmitting an intermediary signal and before transmitting the second RS.

As noted above, bundled RSs may have a time gap between their transmissions. If a UE is to transmit the bundled RSs, the UE may use the same PA and LO and other components to transmit the RSs and other signals. Therefore, needing to change the PA state, carrier frequency, or any other configurations for transmission may cause noise if the components are not allowed to settle before transmission. In the above example, the time gap between a transmission of a signal subsequent to the first RS and a transmission of the second RS may be of sufficient length to allow settling of the components.

Instead of a UE ensuring a sufficient amount of time lapses between transmissions in order to maintain phase coherence, a UE may be configured to prevent transmitting another signal (such as a PRACH signal or a physical uplink control channel (PUCCH) signal) between transmitting the first RS and the second RS. In some implementations, the time gap between the first RS and the second RS may be less than a defined number of time slots (such as 1-3 time slots or another suitable number). If the time gap is small enough, the UE is able to maintain phase coherence by not transmitting during the time gap (thus allowing the PA and other components to remain in the same state) while not significantly increasing transmission latency. In some implementations, a transmission on a DL to the UE may be scheduled for the time gap so that the UE is configured to receive a signal on the DL during such time gap.

As noted above, a location server may define the RSs to be used. The location server may also determine if the RSs are to be bundled. In some implementations, the location server (or another suitable network component) may provide an indication that the RSs are to be bundled. For example, the location server may indicate in the assistance data that the RSs are to be bundled, and the assistance data is received by a base station. A UE may also receive the indication, which may be forwarded or otherwise provided by the base station. In this manner, a device receiving the RSs may configure from which RSs a doppler measurement is to be calculated. If the indication is that the RSs are bundled, both RSs may be used to calculate a doppler measurement. Conversely, if the RSs are not bundled, only the second RS may be used to calculate a doppler measurement.

A doppler measurement may include any suitable measurement associated with a doppler shift of a signal between the UE and the base station. For example, a doppler measurement may be a measured frequency offset between the carrier frequency used at transmission and the observed frequency at reception of a RS (or of bundled RSs).

Referring back to FIG. 7, at 708, the device may report the doppler measurement, where the doppler measurement is to be used for calculating a position of the UE. For example, if a base station calculates a doppler measurement (such as measuring a frequency offset), the doppler measurement may be reported to a core network component, which is then provided to a location server. If a UE calculates a doppler measurement (such as measuring a frequency offset), the doppler measurement may be transmitted to a base station (or another UE) in an information element (IE), with doppler measurement eventually reaching the location server. In addition, the base station or UE may also report a range measurement (such as a RTT or a measured tx-rx time difference) that is to be received by the location server. The location server may then use the doppler measurement (and range measurement) to calculate a location of the UE.

If the reporting device is a UE, any suitable IE may be used for transmitting the doppler measurement. In some implementations, a doppler measurement may be reported in any suitable proprietary IE. In some other implementations, a doppler measurement may be reported in an existing IE that the UE is to transmit. For example, the IE may report the doppler measurement in a NR-Doppler-SignalMeasurementInformation IE, which may be defined by the 3GPP for NR. The NR-Doppler-SignalMeasurementInformation IE may also include one or more of a time-stamp associated with calculating the doppler measurement, a transmit-receive point (TRP) ID associated with the BS, a cell ID associated with the BS, an absolute radio frequency channel number (ARFCN) associated with a channel for receiving the first RS and the second RS, or a resource ID used for calculating the doppler measurement. In addition or alternative to the UE reporting the resource ID, the base station may indicate to the location server the resource ID used for the doppler measurement.

In another example, the UE may report the doppler measurement in an existing NR-Multi-RTT-SignalMeasurementInformation IE. The original NR-Multi-RTT-SignalMeasurementInformation IE is defined in 3GPP TS 37.355. The NR-Multi-RTT-SignalMeasurementInformation IE may include rx-tx time difference measurements as range measurements, and the NR-Multi-RTT-SignalMeasurementInformation IE may be modified to include the doppler measurement. In this manner, range measurements and doppler measurements may be included in the same IE.

An instance of the NR-Multi-RTT-SignalMeasurementInformation IE may be transmitted by the UE for each RS received by the UE. In this manner, the UE transmits a first instance of a NR-Multi-RTT-SignalMeasurementInformation IE for the first RS (i.e., a first PRS) and a second instance of a NR-Multi-RTT-SignalMeasurementInformation IE for the second RS (such as a second PRS or a different type RS consecutive to the first RS). In some implementations, if the UE uses both the first RS and the second RS to calculate a doppler measurement (with the RSs bundled), the doppler measurement may be included in both the first instance and the second instance of the NR-Multi-RTT-SignalMeasurementInformation IE.

In some other implementations, the UE may include the doppler measurement in only one of a first instance of the NR-Multi-RTT-SignalMeasurementInformation IE or a second instance of the NR-Multi-RTT-SignalMeasurementInformation IE. For example, the UE may use only the second RS for the doppler measurement. As such, the doppler measurement may be included in the second instance of the NR-Multi-RTT-SignalMeasurementInformation IE (with the doppler measurement being excluded from the first instance of the NR-Multi-RTT-SignalMeasurementInformation IE). In some implementations, the UE may indicate during configuration which NR-Multi-RTT-SignalMeasurementInformation IEs are to include a doppler measurement. For example, the UE may indicate to the base station that every NR-Multi-RTT-SignalMeasurementInformation IE is to include a doppler measurement or only a subset of the NR-Multi-RTT-SignalMeasurementInformation IEs is to include a doppler measurement. To note, with limited wireless medium resources being allocated for certain IEs, excluding doppler measurements from one or more IEs may conserve wireless medium resources, which may improve throughput.

Regarding if the base station is to calculate and report the doppler measurement, the base station may indicate to the location server the resource ID used for the doppler measurement. To note, the base station may report the doppler measurement and the resource ID in any suitable manner so that they are received by the location server.

As noted above, a location server may use a doppler measurement to determine a location of a UE. For example, referring back to FIG. 4, the doppler cone 408 may be referred to as a range rate cone indicating the range rate between the UE 404 and the SV 402. The range rate indicates the velocity at which the UE is moving towards or away from the base station (such as the SV). Points on the surface of the cone indicate potential locations of the UE 404 associated with a same range rate calculated for the UE 404. The range rate may be calculated using equation (1) below:

$$R = -\frac{c}{2}\left(\frac{f_{meas,BS}}{f_R} + \frac{f_{meas,UE}}{f_F}\right) \qquad (1)$$

R is the range rate and C is the speed of light. $f_{meas,BS}$ is the frequency offset at the base station (such as at the SV). $f_{meas,UE}$ is the frequency offset at the UE. $f_R$ is the carrier frequency on the UL. $f_F$ is the carrier frequency on the DL. To note, even if a base station uses different LOs for transmission and reception, the offset between the frequencies generated by the LOs (attempting to generate the same frequency) at the base station may be negligible based on the quality of the components (without size and power restrictions) to ensure almost no unintended difference in outputs by the LOs. If a range rate is calculated based on exclusively a UL RS or a DL RS with reference to equation (1) above, the range rate may be calculated using equation (2) below for a UL RS or using equation (3) below for a DL RS:

$$R = -C\left(\frac{f_{meas,BS}}{f_R}\right) \quad (2)$$

$$R = -C\left(\frac{f_{meas,UE}}{f_F}\right) \quad (3)$$

To note, while the location server is described as calculating a range rate, in some implementations, the device calculating and reporting the doppler measurement may calculate the range rate, with the range rate being the doppler measurement reported to the location server. The location server may use a range rate and a range to calculate the location of the UE on the earth surface.

If a UE uses the same LO for receive and for transmit, there are no different LOs to cause an unintended frequency offset between transmission and reception, and equation (1) above may be used to calculate a range rate without further calculations or modification. However, a UE may include different LOs for receiving and transmitting. Unlike the base station, differences in the frequency of the LO outputs may be significant enough to impact the doppler measurements (such as in calculating a range rate). For example, smaller and lower power LOs and components may be used to preserve a UE's battery power (while such design considerations may not be required for a base station), and those LOs may have an inherent frequency offset between each other. As a result, the unintended frequency offset may impact calculations of the range rate.

Figure 8:
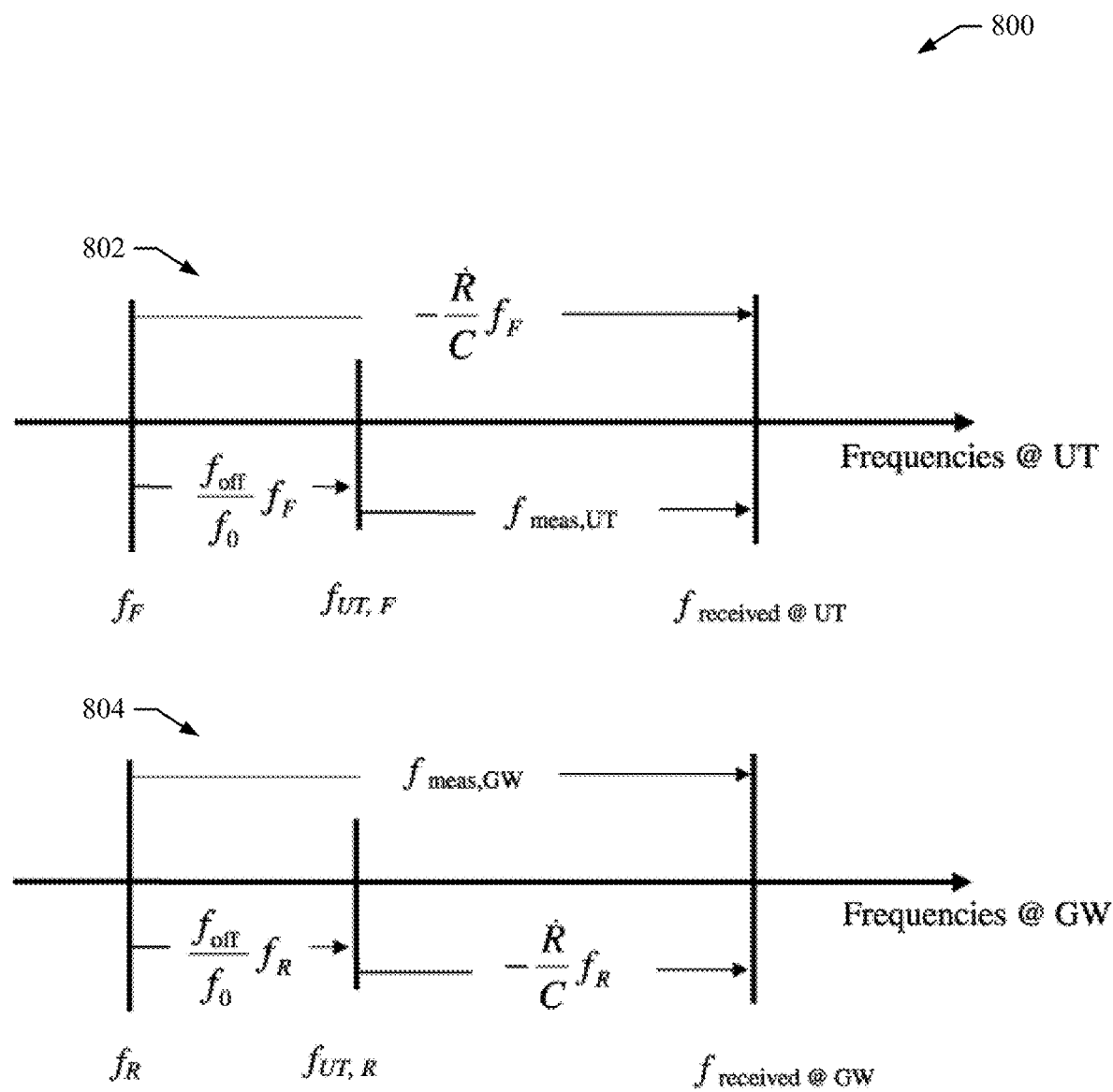
FIG. 8 is a frequency diagram of an example frequency offset of a reference signal measured on a downlink (DL) and of a frequency offset of a reference signal measured on an uplink (UL).

FIG. 8 is a frequency diagram 800 of an example frequency offset of a reference signal measured on a DL (as depicted by frequency diagram 802) and of a frequency offset of a reference signal measured on an UL (as depicted by frequency diagram 804). In the diagram 800, UT is an abbreviation for user terminal, which refers to the UE, GW is an abbreviation for gateway, which refers to the base station. As noted above for equation (1), R is the range rate and C is the speed of light. $f_{meas,GW}$ is the measured frequency offset at the base station (such as at the SV). $f_{meas,UT}$ is the measured frequency offset at the UE. $f_R$ is the carrier frequency on the UL. $f_F$ is the carrier frequency on the DL. $f_{off}$ is the frequency offset between the LO for receiving and the LO for transmitting at the UE. $f_0$ is a reference frequency of the LOs (so that $$\frac{f_{off}}{f_0}$$

is the normalized frequency offset of the LOs).

For the DL as depicted in frequency diagram 802, the actual frequency offset $$\left(-\frac{R}{C}f_F\right)$$

is from the carrier frequency $f_F$ to the frequency of the signal as received at the UE ($f_{received\ @\ UT}$). However, because of the frequency offset between the different LOs for a UE, the measured frequency offset $f_{meas,UT}$ is less than the actual frequency offset by the normalized frequency offset of the LOs $$\frac{f_{off}}{f_0}$$

times the carrier frequency $f_F$.

For the UL as depicted in frequency diagram 804, the carrier frequency is impacted by the frequency offset of the LOs. As a result, the actual carrier frequency used by the UE ($f_{UT,R}$) differs from the desired frequency offset $f_R$ by the normalized frequency offset of the LOs $$\frac{f_{off}}{f_0}$$

times the carrier frequency $f_R$. As such, the base station may assume that the carrier frequency is $f_R$ so that the measured frequency offset of the RS($f_{meas,GW}$) is from the assumed carrier frequency $f_R$ to the frequency of the RS as received ($f_{received\ @\ GW}$). However, the actual frequency offset ( $$-\frac{R}{C}f_R$$

) to be used to calculate a range rate is from the used carrier frequency $f_{UT,R}$ to the frequency of the signal as received at the BS ($f_{received\ @\ GW}$), which is less than the measured frequency offset by the normalized frequency offset of the LOs $$\frac{f_{off}}{f_0}$$

times the carrier frequency $f_R$.

As a result, the normalized frequency offset based on the different LOs may be needed to calculate a range rate and thus a location of a UE. As noted above, if the UE uses the same LO for transmission and reception, there is no frequency offset regarding different LOs to impact the range rate. In some implementations, the UE may report whether the UE uses a same LO for both receiving and transmitting. For example, during configuration of the UE when connecting to the wireless network, the UE may transmit a flag or other indicator to indicate if the UE uses different LOs.

If the UE indicates that different LOs are used for reception and transmission, the UE may calculate and report the LO normalized frequency offset, with the location server ultimately receiving the indication of the LO normalized frequency offset. For example, during calibration of the UE or over operation of the UE, the UE may be configured to calculate and store the LO normalized frequency offset. When the UE connects to a base station of the wireless network or is configured for UE positioning in the wireless network, the UE may indicate the stored LO normalized frequency offset to the base station and on to the location server. In this manner, the location server may use the LO normalized frequency offset to correctly determine the range rate based on a measured frequency offset at the base station or at the UE (thus correcting for errors in the measured frequency offset as a result of the normalized LO frequency offset).

Alternative to indicating whether the UE includes different LOs for reception and transmission, the UE using different LOs may be configured to always report a LO normalized frequency offset. If the location server does not receive an indication of a LO normalized frequency offset for a UE, the location server may assume that the same LO is used for both reception and transmission for the UE. Alternatively, the UE may be configured to transmit that the LO normalized frequency offset is zero if the UE uses the same LO for both reception and transmission.

Various implementations are described above for a device to calculate and report a doppler measurement for use in UE positioning. For a NTN (or even a TN), the doppler measurement (along with a range measurement) associated with a UE may be used by a location server to calculate a location of a UE. While LO frequency offset and PA state switching are described above as example factors that may impact doppler measurements (such as a range rate) and range measurements (such as a RTT), another factor that may impact UE positioning accuracy in a NTN is the location of the UE with reference to the subtrack of the SV. In particular, a cross-track positioning error increases exponentially as the UE approaches the subtrack of the SV. In some implementations, one or more positioning sessions may be scheduled for a UE and SV to ensure that the UE is not always near the subtrack of the SV. A positioning session may refer to an instance during which the first and second RS are received (from which the doppler and range measurements are calculated and a location of the UE is determined).

Figure 9:
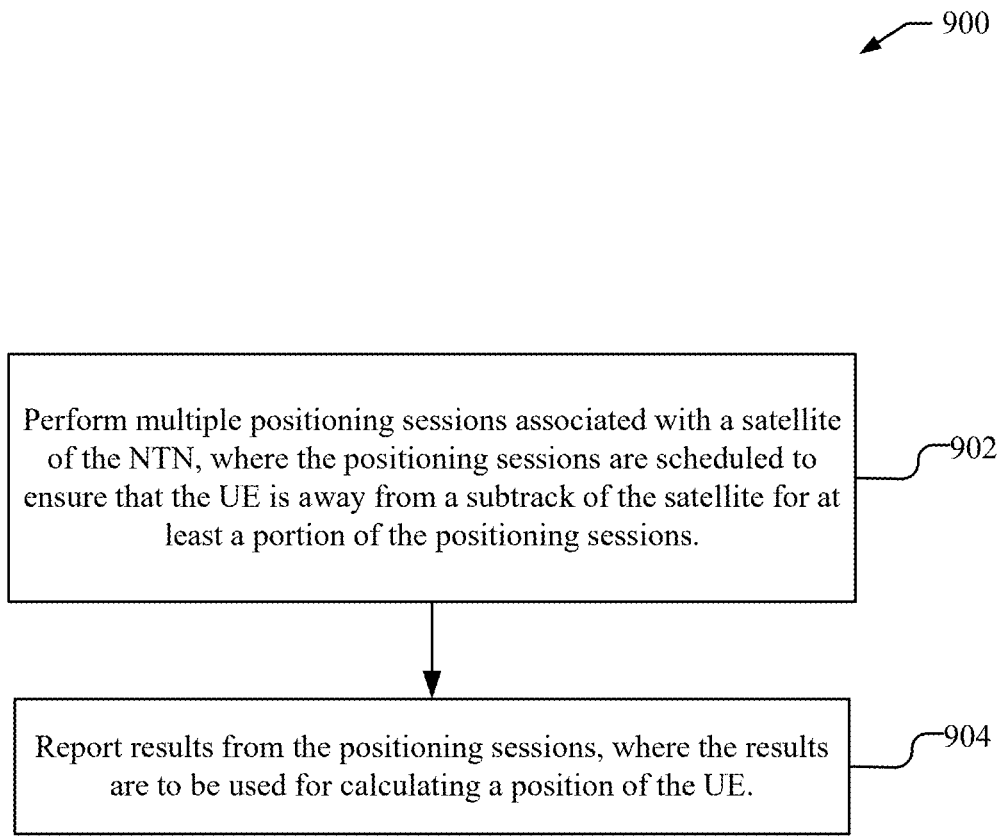
FIG. 9 shows a flowchart of an example procedure for a device to perform NTN based UE positioning based on multiple positioning sessions.

FIG. 9 shows a flowchart of an example procedure 900 for a device to perform NTN based UE positioning based on multiple positioning sessions. The process 900 may be performed by a UE (such as UE 105 in FIGS. 1, 2, and 3) or a base station (such as a SV, an earth station, a gNB, or a combination thereof in FIGS. 1, 2, and 3). At 902, the device performs multiple positioning sessions associated with a satellite of the NTN, where the positioning sessions are scheduled to ensure that the UE is away from a subtrack of the satellite for at least a portion of the positioning sessions. If the positioning sessions are scheduled to ensure that the UE is away from the SV's subtrack (such as greater than a threshold distance associated with a maximum cross-track error) while the UE is still in the coverage area of the SV for at least a subset of positioning sessions, that subset of positioning sessions may be used to calculate more accurate doppler measurements and thus be used to calculate more accurate UE positions.

Because it is unlikely that a UE is exactly on an SV's subtrack and further because a UE is likely mobile and moving within a coverage area associated with the SV, the UE may not remain on the SV's subtrack as the SV traverses over the earth surface. Therefore, while a first positioning session may be associated with the UE being approximately on the subtrack of the SV, subsequent or preceding positioning sessions (in which the position of the SV and the UE differs) may be associated with the UE being away from the subtrack of the SV.

With reference to block 902, a network component (such as a gNB or a core network component) may schedule a plurality of positioning sessions to be performed between the UE and the same SV for calculating doppler measurements and range measurements for that UE (which may be used to calculate a position of the UE). For example, during a positioning measurement based on DL RSs, a UE receiving the RSs may calculate a frequency offset and a rx-tx transmission time difference. The frequency offset may be used to calculate a range rate (such as describe above), and the rx-tx transmission time difference may be used to calculate a distance between the UE and the SV, with such being used to calculate a position of the UE.

The multiple positioning sessions may be dispersed over a duration of time (during which the UE remains within coverage of the SV) to increase the likelihood that at least a subset of the positioning sessions are associated with the UE being away from the subtrack of the SV. For example, 30 positioning sessions may be scheduled over a one hour period such that a positioning session occurs once every two minutes between the same UE and the same SV. However, the duration of time over which the multiple positioning sessions are to occur may be defined in any suitable manner. In addition, the spacing in time between the positioning sessions may be defined in any suitable manner. For example, the duration of time may be based on the speed of the SV with reference to the earth's surface (which may affect the amount of time that a UE may be within coverage of the SV). In another example, the spacing of the positioning sessions may be based on a latency requirement for UE positioning (such as what applications are being executed by the UE, including whether or not the UE is performing location based services, such as navigation). In some implementations, the duration and spacing of the positioning sessions may be based on previous observations as to a desired number of positioning sessions and a desired duration to reduce cross-track errors for UE positioning.

At block 904, the device reports the results from the positioning sessions, where the results are to be used for calculating a position of the UE. As described above with reference to block 708 in FIG. 7, a UE may transmit the doppler and range measurements in any suitable IE, or a base station may transmit doppler and range measurements in any suitable manner to the core network (with the location server receiving the measurements). In some implementations of reducing cross track error, the location server may attempt to calculate a UE position for each positioning session in sequence, and the location server may identify outliers in the sequence of UE positions as those impacted by cross track error. The outlier UE positions may be disregarded, with the remaining UE positions able to be used.

In addition to a UE being near a SV's subtrack causing errors in UE positioning, variations in the UE's height from the earth's surface may also cause errors in UE positioning. For example, referring back to FIG. 4, the earth surface 410 is depicted as smooth with a static elevation for clarity, but the Earth's actual surface varies in elevation. If an assumed smooth service of the Earth would be used to calculate a UE position, the difference in actual elevation to assumed elevation would impact the range measurement, and changes in elevation may impact the doppler measurement.

A location server may use a topographical map to identify the UE's potential elevation when calculating the UE error to reduce errors. However, man-made objects may also impact the height of the UE from the earth's surface. For example, a UE at the top of a skyscraper may have a large difference in height as compared to a UE at the bottom of the skyscraper.

To reduce UE positioning errors associated with a UE's assumed height, in some implementations, the device may obtain a height of the UE and report the height of the UE. For example, during a positioning session, the device may obtain the current height of the UE and report such with the other position measurements. In some implementations, if the device is the UE, the UE may measure the height using a UE elevation sensor. For example, the UE may include a barometric altitude sensor to measure the height of the UE above sea level (with the height being based on variations in the earth's surface and man-made objects (such as different stories of building)). Additionally or alternatively, obtaining the height of the UE may include obtaining the height from a user input. For example, the UE may include a user interface for a user to enter an approximate height of the UE from the earth surface (such as a user indicating that he or she is currently located on the fifth floor of an office building). In further addition or as an alternative, the device may obtain the height from a nearby UE. For example, a UE close to the UE may include a sensor or otherwise be able to indicate it's height with reference to the earth surface, and the UE may indicate its height to the SV (which is provided to the location server). If the nearby UE is close enough to the UE in question, the height of the nearby UE may be assumed to be the height of the UE in question. If a UE is to provide an indication of height, the sensor measurements, user inputs, or other indications of the height may be included in the IEs including the doppler measurements from a UE or may be transmitted separately.

If a SV is to receive UL RSs for UE positioning, the base station (such as a gNB) may obtain an indication of the height from the UE or from a nearby UE in the coverage area of the SV (with the height being determined in any suitable manner, such as described above). The base station may transmit the indications of height to the location server (such as via the core network). In this manner, the location server is able to further reduce cross-track error by compensating for the UE's height from the earth surface.

As described above, a UE and base station (such as a satellite, earth station, and/or gNB) in a NTN may be configured for UE positioning even when only one satellite is within LOS of the UE. For example, the UE and base station may be configured to calculate doppler and range measurements and report such measurements for use by a location server to calculate a position of the UE. Also described are example implementations to reduce cross-track error that may occur as a result of using only one satellite for UE positioning (which may be caused by location of the UE with reference to the subtrack of the satellite and/or height of the UE from the earth surface).

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the disclosure as defined by the claims.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), user terminal (UT), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. A mobile device or user equipment (UE) may also be referred to as a mobile terminal, a terminal, a device, a Secure User Plane Location Enabled Terminal (SET), a target device, a target, or by some other name. As used herein, a base station may refer to a terrestrial base station, an SV, a satellite, an earth station, a gNB, a gNB-CU, a gNB-DU, or a combination thereof. A base station may also be referred to as a gateway or by some other name. To note, while some of the techniques, processes, and/or implementations presented herein may comply with all or part of one or more standards, such techniques, processes, and/or implementations may not, in some embodiments, comply with part or all of such one or more standards.

In view of this description, embodiments may include different combinations of features. Implementation examples are described in the following numbered clauses:

1. A method performed by a device for performing non-terrestrial network (NTN) based positioning, the method including:
   receiving a first reference signal (RS) from a first device, where the first RS is one of a positioning reference signal (PRS) from a base station (BS) or a sounding reference signal (SRS) from a user equipment (UE);
   receiving a second RS from the first device, where the second RS is associated with the first RS;

calculating a doppler measurement based on one or both of the first RS or the second RS; and
reporting the doppler measurement, where the doppler measurement is to be used for calculating a position of the UE.

2. The method of clause 1, where the second RS being associated with the first RS includes the second RS being allocated within a defined time window of the first RS.

3. The method of clause 1, where the second RS being associated with the first RS is based on one of:
a quasi-colocation (QCL) type A configuration;
a QCL type B configuration; or
a QCL type C configuration.

4. The method of clause 1, where only the second RS is used to calculate the doppler measurement when the second RS is not bundled with the first RS.

5. The method of clause 1, where the second RS is bundled with the first RS, where:
bundling the second RS with the first RS includes maintaining a phase coherence between the first RS and the second RS; and
calculating the doppler measurement is based on both the first RS and the second RS.

6. The method of clause 5, where the second RS being bundled with the first RS includes the first RS and the second RS being received in a same bandwidth.

7. The method of clause 5, further including receiving an indication generated by a network component that the second RS is bundled with the first RS.

8. The method of clause 1, where:
the device is the UE;
the first device is the BS; and
the first RS is the PRS.

9. The method of clause 8, where the second RS is one of:
a second PRS;
a tracking reference signal (TRS);
a synchronization signal block (SSB); or
a demodulation reference signal (DMRS) associated with the UE.

10. The method of clause 8, where:
a downlink (DL) signal is transmitted by the BS between the first RS and the second RS; and
at least a defined time gap exists between the DL signal and the second RS.

11. The method of clause 8, where reporting the doppler measurement includes reporting the doppler measurement in a NR-Doppler-SignalMeasurementInformation information element (IE).

12. The method of clause 11, where the NR-Doppler-SignalMeasurementInformation IE includes one or more of:
a time-stamp associated with calculating the doppler measurement;
a transmit-receive point (TRP) ID associated with the BS;
a cell ID associated with the BS;
an absolute radio frequency channel number (ARFCN) associated with a channel for receiving the first RS and the second RS; or
a resource ID used for calculating the doppler measurement.

13. The method of clause 8, where reporting the doppler measurement includes reporting the doppler measurement in a NR-Multi-RTT-SignalMeasurementInformation information element (IE).

14. The method of clause 13, where reporting the doppler measurement in the NR-Multi-RTT-SignalMeasurementInformation IE includes reporting the doppler measurement in a first instance of the NR-Multi-RTT-SignalMeasurementInformation IE associated with the PRS and a second instance of the NR-Multi-RTT-SignalMeasurementInformation IE associated with the second RS.

15. The method of clause 13, where reporting the doppler measurement in the NR-Multi-RTT-SignalMeasurementInformation IE includes reporting the doppler measurement in only a second instance of the NR-Multi-RTT-SignalMeasurementInformation IE associated with the second RS, where the doppler measurement is excluded from a first instance of the NR-Multi-RTT-SignalMeasurementInformation IE associated with the PRS.

16. The method of clause 13, further including indicating which instances of the NR-Multi-RTT-SignalMeasurementInformation IE are to include the doppler measurement.

17. The method of clause 1, further including:
reporting whether the UE uses a same local oscillator (LO) for both receiving and transmitting, where calculating a range rate is based on whether the UE uses the same LO for both receiving and transmitting.

18. The method of clause 1, further including:
calculating a local oscillator (LO) normalized frequency offset (FO) between a first LO used for receiving at the UE and a second LO used for transmitting at the UE; and
reporting the LO normalized FO, where the LO normalized FO is used in calculating a range rate.

19. The method of clause 1, where:
the device is the base station;
the first device the UE; and
the first RS is the SRS.

20. The method of clause 19, where the second RS is one of:
a second SRS;
a physical random access channel (PRACH) signal; or
a demodulation reference signal.

21. The method of clause 19, where:
the second RS is bundled with the first RS, where a phase coherence between the first RS and the second RS is maintained by the UE;
a transmission of a first signal from the UE occurs between the first RS and the second RS, where the first signal is of a different bandwidth than the second RS; and
at least a defined time gap exists between the first signal and the second RS.

22. The method of clause 21, where the defined time gap is based on a UE capability report from the UE.

23. The method of clause 19, where:
the second RS is bundled with the first RS, where a phase coherence between the first RS and the second RS is maintained by the UE;
a time gap of less than a defined number of time slots exists between the first RS and the second RS; and
the UE is prevented from transmitting during the time gap.

24. The method of clause 19, further including indicating the resource ID used for calculating the doppler measurement.

25. A device for performing non-terrestrial network (NTN) based positioning, including:
a wireless transceiver configured to wirelessly communicate with one or more network devices;
at least one memory; and
at least one processor coupled to the wireless transceiver and the at least one memory, the at least one processor configured to:

receive, via the wireless transceiver, a first reference signal (RS) from a first device, where the first RS is one of a positioning reference signal (PRS) from a base station (BS) or a sounding reference signal (SRS) from a user equipment (UE);

receive, via the wireless transceiver, a second RS from the first device, where the second RS is associated with the first RS;

calculate a doppler measurement based on one or both of the first RS or the second RS; and report the doppler measurement, where the doppler measurement is to be used for calculating a position of the UE.

26. The device of clause 25, where the second RS being associated with the first RS includes the second RS being allocated within a defined time window of the first RS.

27. The device of clause 25, where the second RS being associated with the first RS is based on one of:
a quasi-colocation (QCL) type A configuration;
a QCL type B configuration; or
a QCL type C configuration.

28. The device of clause 25, where only the second RS is used to calculate the doppler measurement when the second RS is not bundled with the first RS.

29. The device of clause 25, where the second RS is bundled with the first RS, where:
bundling the second RS with the first RS includes maintaining a phase coherence between the first RS and the second RS; and
calculating the doppler measurement is based on both the first RS and the second RS.

30. The device of clause 29, where the second RS being bundled with the first RS includes the first RS and the second RS being received in a same bandwidth.

31. The device of clause 29, where the at least one processor is further configured to receive, via the wireless transceiver, an indication generated by a network component that the second RS is bundled with the first RS.

32. The device of clause 25, where:
the device is the UE;
the first device is the BS; and
the first RS is the PRS.

33. The device of clause 32, where the second RS is one of:
a second PRS;
a tracking reference signal (TRS);
a synchronization signal block (SSB); or
a demodulation reference signal (DMRS) associated with the UE.

34. The device of clause 32, where:
a downlink (DL) signal is transmitted by the BS between the first RS and the second RS; and
at least a defined time gap exists between the DL signal and the second RS.

35. The device of clause 32, where reporting the doppler measurement includes reporting the doppler measurement in a NR-Doppler-SignalMeasurementInformation information element (IE).

36. The device of clause 35, where the NR-Doppler-SignalMeasurementInformation IE includes one or more of:
a time-stamp associated with calculating the doppler measurement;
a transmit-receive point (TRP) ID associated with the BS;
a cell ID associated with the BS;
an absolute radio frequency channel number (ARFCN) associated with a channel for receiving the first RS and the second RS; or
a resource ID used for calculating the doppler measurement.

37. The device of clause 32, where reporting the doppler measurement includes reporting the doppler measurement in a NR-Multi-RTT-SignalMeasurementInformation information element (IE).

38. The device of clause 37, where reporting the doppler measurement in the NR-Multi-RTT-SignalMeasurementInformation IE includes reporting the doppler measurement in a first instance of the NR-Multi-RTT-SignalMeasurementInformation IE associated with the PRS and a second instance of the NR-Multi-RTT-SignalMeasurementInformation IE associated with the second RS.

39. The device of clause 37, where reporting the doppler measurement in the NR-Multi-RTT-SignalMeasurementInformation IE includes reporting the doppler measurement in only a second instance of the NR-Multi-RTT-SignalMeasurementInformation IE associated with the second RS, where the doppler measurement is excluded from a first instance of the NR-Multi-RTT-SignalMeasurementInformation IE associated with the PRS.

40. The device of clause 25, where the at least one processor is further configured to indicate, via the wireless transceiver, which instances of the NR-Multi-RTT-SignalMeasurementInformation IE are to include the doppler measurement.

41. The device of clause 25, where the at least one processor is further configured to:
report, via the wireless transceiver, whether the UE uses a same local oscillator (LO) for both receiving and transmitting, where calculating a range rate is based on whether the UE uses the same LO for both receiving and transmitting.

42. The device of clause 25, where the at least one processor is further configured to:
calculate a local oscillator (LO) normalized frequency offset (FO) between a first LO used for receiving at the UE and a second LO used for transmitting at the UE; and
report, via the wireless transceiver, the LO normalized FO, where the LO normalized FO is used in calculating a range rate.

43. The device of clause 25, where:
the device is the base station;
the first device the UE; and
the first RS is the SRS.

44. The device of clause 43, where the second RS is one of:
a second SRS;
a physical random access channel (PRACH) signal; or
a demodulation reference signal.

45. The device of clause 43, where:
the second RS is bundled with the first RS, where a phase coherence between the first RS and the second RS is maintained by the UE;
a transmission of a first signal from the UE occurs between the first RS and the second RS, where the first signal is of a different bandwidth than the second RS; and
at least a defined time gap exists between the first signal and the second RS.

46. The device of clause 45, where the defined time gap is based on a UE capability report from the UE.

47. The device of clause 43, where:
the second RS is bundled with the first RS, where a phase coherence between the first RS and the second RS is maintained by the UE;

a time gap of less than a defined number of time slots exists between the first RS and the second RS; and the UE is prevented from transmitting during the time gap.

48. The device of clause 43, wherein the at least one processor is further configured to indicate, via the wireless transceiver, the resource ID used for calculating the doppler measurement.

49. A method performed by a device for performing non-terrestrial network (NTN) based positioning, the method including:

performing multiple positioning sessions associated with a user equipment (UE) and a satellite of the NTN, where the positioning sessions are scheduled to ensure that the UE is away from a subtrack of the satellite for at least a portion of the positioning sessions; and reporting results from the positioning sessions, where the results are to be used for calculating a position of the UE.

50. The method of clause 49, further including:

obtaining a height of the UE; and reporting the height of the UE, where the height is to be used to calculate a position of the UE.

51. The method of clause 50, where obtaining the height of the UE includes one or more of:

measuring the height using a UE elevation sensor;

obtaining the height from a user input; or obtaining the height from a nearby UE.

52. A device for performing non-terrestrial network (NTN) based positioning, the device including:

a wireless transceiver configured to wirelessly communicate with one or more network devices;

at least one memory; and at least one processor coupled to the wireless transceiver and the at least one memory, the at least one processor configured to:

perform multiple positioning sessions associated with a user equipment (UE) and a satellite of the NTN, where the positioning sessions are scheduled to ensure that the UE is away from a subtrack of the satellite for at least a portion of the positioning sessions; and report, via the wireless transceiver, results from the positioning sessions, where the results are to be used for calculating a position of the UE.

53. The device of clause 52, where the at least one processor is further configured to:

obtain a height of the UE; and report, via the wireless transceiver, the height of the UE, where the height is to be used to calculate a position of the UE.

54. The device of clause 53, where obtaining the height of the UE includes one or more of:

measuring the height using a UE elevation sensor;

obtaining the height from a user input; or obtaining the height from a nearby UE.

Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by a device for performing non-terrestrial network (NTN) based positioning, the method comprising:

receiving, by a user equipment (UE), a first reference signal (RS) from a base station (BS), wherein the first RS comprises a positioning reference signal (PRS) from the BS;

receiving a second RS from the BS, wherein the second RS is associated with the first RS and comprises one of: a second PRS, a tracking reference signal (TRS), a synchronization signal block (SSB), or a demodulation reference signal (DMRS) associated with the UE;

calculating a doppler measurement based on one or both of the first RS or the second RS; and reporting the doppler measurement, wherein the doppler measurement is to be used for calculating a position of the UE.

2. The method of claim 1, wherein the second RS being associated with the first RS includes the second RS being allocated within a defined time window of the first RS.

3. The method of claim 1, wherein only the second RS is used to calculate the doppler measurement when the second RS is not bundled with the first RS.

4. The method of claim 1, wherein the second RS is bundled with the first RS, wherein:

bundling the second RS with the first RS includes maintaining a phase coherence between the first RS and the second RS; and calculating the doppler measurement is based on both the first RS and the second RS.

5. The method of claim 4, wherein the second RS being bundled with the first RS includes the first RS and the second RS being received in a same bandwidth.

6. The method of claim 1, wherein:

a downlink (DL) signal is transmitted by the BS between the first RS and the second RS; and at least a defined time gap exists between the DL signal and the second RS.

7. The method of claim 1, wherein reporting the doppler measurement includes reporting the doppler measurement in one of:

a NR-Doppler-SignalMeasurementInformation information element (IE); or a NR-Multi-RTT-SignalMeasurementInformation information element (IE).

8. The method of claim 1, further comprising:

reporting whether the UE uses a same local oscillator (LO) for both receiving and transmitting, wherein calculating a range rate is based on whether the UE uses the same LO for both receiving and transmitting.

9. The method of claim 1, further comprising:

calculating a local oscillator (LO) normalized frequency offset (FO) between a first LO used for receiving at the UE and a second LO used for transmitting at the UE; and reporting the LO normalized FO, wherein the LO normalized FO is used in calculating a range rate.

10. The method of claim 1, wherein:

the second RS is bundled with the first RS, wherein a phase coherence between the first RS and the second RS is maintained by the UE;

a transmission of a first signal from the UE occurs between the first RS and the second RS, wherein the first signal is of a different bandwidth than the second RS; and at least a defined time gap exists between the first signal and the second RS.

11. The method of claim 1, wherein:
the second RS is bundled with the first RS, wherein a phase coherence between the first RS and the second RS is maintained by the UE;
a time gap of less than a defined number of time slots exists between the first RS and the second RS; and
the UE is prevented from transmitting during the time gap.

12. A device for performing non-terrestrial network (NTN) based positioning, comprising:
a wireless transceiver of a user equipment (UE), the wireless transceiver configured to wirelessly communicate with one or more network devices;
at least one memory; and
at least one processor coupled to the wireless transceiver and the at least one memory, the at least one processor configured to:
receive, via the wireless transceiver, a first reference signal (RS) from a base station (BS), wherein the first RS comprises a positioning reference signal (PRS) from the BS;
receive, via the wireless transceiver, a second RS from the BS, wherein the second RS is associated with the first RS and comprises one of: a second PRS, a tracking reference signal (TRS), a synchronization signal block (SSB), or a demodulation reference signal (DMRS) associated with the UE;
calculate a doppler measurement based on one or both of the first RS or the second RS; and
report the doppler measurement, wherein the doppler measurement is to be used for calculating a position of the UE.

13. The device of claim 12, wherein the second RS being associated with the first RS includes the second RS being allocated within a defined time window of the first RS.

14. The device of claim 12, wherein only the second RS is used to calculate the doppler measurement when the second RS is not bundled with the first RS.

15. The device of claim 12, wherein the second RS is bundled with the first RS, wherein:
bundling the second RS with the first RS includes maintaining a phase coherence between the first RS and the second RS; and
calculating the doppler measurement is based on both the first RS and the second RS.

16. The device of claim 15, wherein the second RS being bundled with the first RS includes the first RS and the second RS being received in a same bandwidth.

17. The device of claim 12, wherein:
a downlink (DL) signal is transmitted by the BS between the first RS and the second RS; and
at least a defined time gap exists between the DL signal and the second RS.

18. The device of claim 12, wherein reporting the doppler measurement includes reporting the doppler measurement in one of:
a NR-Doppler-SignalMeasurementInformation information element (IE); or
a NR-Multi-RTT-SignalMeasurementInformation information element (IE).

19. The device of claim 12, wherein the at least one processor is further configured to:
report, via the wireless transceiver, whether the UE uses a same local oscillator (LO) for both receiving and transmitting, wherein calculating a range rate is based on whether the UE uses the same LO for both receiving and transmitting.

20. The device of claim 12, wherein the at least one processor is further configured to:
calculate a local oscillator (LO) normalized frequency offset (FO) between a first LO used for receiving at the UE and a second LO used for transmitting at the UE; and
report, via the wireless transceiver, the LO normalized FO, wherein the LO normalized FO is used in calculating a range rate.

21. The device of claim 12, wherein:
the second RS is bundled with the first RS, wherein a phase coherence between the first RS and the second RS is maintained by the UE;
a transmission of a first signal from the UE occurs between the first RS and the second RS, wherein the first signal is of a different bandwidth than the second RS; and
at least a defined time gap exists between the first signal and the second RS.

22. The device of claim 12, wherein:
the second RS is bundled with the first RS, wherein a phase coherence between the first RS and the second RS is maintained by the UE;
a time gap of less than a defined number of time slots exists between the first RS and the second RS; and
the UE is prevented from transmitting during the time gap.

23. A method performed by a device for performing non-terrestrial network (NTN) based positioning, the method comprising:
performing multiple positioning sessions associated with a user equipment (UE) and a satellite of the NTN, wherein the positioning sessions are scheduled to ensure that the UE is away from a subtrack of the satellite for at least a portion of the positioning sessions; and
reporting results from the positioning sessions, wherein the results are to be used for calculating a position of the UE.

24. The method of claim 23, further comprising:
obtaining a height of the UE; and
reporting the height of the UE, wherein the height is to be used to calculate a position of the UE.

25. A user equipment (UE) for performing non-terrestrial network (NTN) based positioning, the UE comprising:
a wireless transceiver configured to wirelessly communicate with one or more network devices;
at least one memory; and
at least one processor coupled to the wireless transceiver and the at least one memory, the at least one processor configured to:
perform multiple positioning sessions associated with a satellite of the NTN, wherein the positioning sessions are scheduled to ensure that the UE is away from a subtrack of the satellite for at least a portion of the positioning sessions; and
report, via the wireless transceiver, results from the positioning sessions, wherein the results are to be used for calculating a position of the UE.

26. The UE of claim 25, wherein the at least one processor is further configured to:
obtain a height of the UE; and
report, via the wireless transceiver, the height of the UE, wherein the height is to be used to calculate a position of the UE.

* * * * *